United States Patent
Mattice et al.

(10) Patent No.: US 7,855,717 B2
(45) Date of Patent: Dec. 21, 2010

(54) TOUCH SCREEN APPARATUS AND METHOD

(75) Inventors: Harold E. Mattice, Gardnerville, NV (US); Richard L. Wilder, Sparks, NV (US)

(73) Assignee: IGT, Reno, NV (US)

( * ) Notice: Subject to any disclaimer, the term of this patent is extended or adjusted under 35 U.S.C. 154(b) by 1033 days.

(21) Appl. No.: 10/804,689

(22) Filed: Mar. 19, 2004

(65) Prior Publication Data

US 2005/0206625 A1    Sep. 22, 2005

(51) Int. Cl.
G09G 5/00 (2006.01)
(52) U.S. Cl. .......................................... 345/173; 463/16
(58) Field of Classification Search .................. 463/16, 463/12, 13, 20, 36; 345/173, 180, 178, 179; 178/18.05
See application file for complete search history.

(56) References Cited

U.S. PATENT DOCUMENTS

| | | | |
|---|---|---|---|
| 5,525,764 A | | 6/1996 | Junkins et al. |
| 5,796,389 A | | 8/1998 | Bertram et al. ............. 345/173 |
| 5,951,397 A | | 9/1999 | Dickinson .................... 463/36 |
| 5,956,020 A | * | 9/1999 | D'Amico et al. ............ 345/173 |
| 5,973,417 A | | 10/1999 | Goetz et al. |
| 5,977,961 A | * | 11/1999 | Rindal ........................ 345/208 |
| 6,043,810 A | * | 3/2000 | Kim et al. .................... 345/173 |
| 6,124,848 A | | 9/2000 | Ballare et al. |
| 6,249,234 B1 | * | 6/2001 | Ely et al. ....................... 341/20 |
| 6,476,798 B1 | * | 11/2002 | Bertram et al. ............. 345/174 |
| 6,492,979 B1 | | 12/2002 | Kent et al. |
| 6,888,538 B2 | * | 5/2005 | Ely et al. ..................... 345/173 |
| 7,663,606 B2 | | 2/2010 | Mattice et al. |

(Continued)

FOREIGN PATENT DOCUMENTS

EP    0257775    3/1988

(Continued)

OTHER PUBLICATIONS

Examination Report Under Section 18(3) dated Aug. 1, 2006 for Application No. GB0505660.1, 2 pages (IGT1P210GB).

(Continued)

*Primary Examiner*—Dmitry Suhol
*Assistant Examiner*—Malina K Rustemeyer
(74) *Attorney, Agent, or Firm*—Weaver Austin Villeneuve & Sampson LLP

(57) ABSTRACT

In a method for determining a position of a touch on a touch screen, a first sinusoidal signal is provided to an electrode on a touch screen, the first sinusoidal signal having a frequency. A signal flowing from the first electrode is sensed to generate a sensed signal, and the sensed signal is multiplied by a second sinusoidal signal to generate a first multiplied signal, the second sinusoidal signal having the frequency, the second sinusoidal signal having a phase. The first sensed signal is also multiplied by a third sinusoidal signal to generate a second multiplied signal, the third sinusoidal signal having the frequency, the third sinusoidal signal having a phase different from the phase of the second sinusoidal signal by 90 degrees. The first multiplied signal is filtered to generate a first filtered signal, and the second multiplied signal is filtered to generate a second filtered signal. An estimated touch position is generated based on the first filtered signal and the second filtered signal.

13 Claims, 23 Drawing Sheets

U.S. PATENT DOCUMENTS

| | | |
|---|---|---|
| 2003/0067451 A1 | 4/2003 | Tagg et al. |
| 2004/0107072 A1 | 6/2004 | Dietrich et al. |
| 2004/0178995 A1 | 9/2004 | Sterling |
| 2005/0148870 A1 | 7/2005 | Dryselius et al. |
| 2005/0206626 A1 | 9/2005 | Mattice et al. |
| 2006/0278240 A1 | 12/2006 | Spillman et al. |

FOREIGN PATENT DOCUMENTS

| | | |
|---|---|---|
| EP | 0709762 | 5/1996 |
| GB | 2412177 | 9/2005 |
| GB | 2443056 | 4/2008 |
| GB | 2413186 | 7/2008 |

OTHER PUBLICATIONS

US Non-Final Office Action dated Sep. 13, 2007, for U.S. Appl. No. 10/805,007.

US Final Office Action dated Apr. 28, 2008, for U.S. Appl. No. 10/805,007.

Notice of Allowance dated Oct. 20, 2008, for U.S. Appl. No. 10/805,007.

Notice of Allowance dated Mar. 20, 2009, for U.S. Appl. No. 10/805,007.

Notice of Allowance dated Oct. 6, 2009, for U.S. Appl. No. 10/805,007.

GB Search Report under Section 17(5), Appl. No. GB0505662.7, Aug. 11, 2005.

GB Examination Report dated Apr. 18, 2007 from Foreign Application No. GB0505662.7.

GB Examination Report dated May 7, 2008 from Foreign Application No. GB0505662.7.

GB Examination Report dated Jan. 4, 2008 from Foreign Application No. GB0718407.0.

* cited by examiner

TOUCH SCREEN APPARATUS AND METHOD

CROSS-REFERENCE TO RELATED APPLICATIONS

The present disclosure is related to U.S. patent application Ser. No. 10/805,007, filed on the same day as the present application, entitled "Apparatus and Method For Configuring a Touch Screen," and which is hereby incorporated by reference in its entirety for all purposes.

BACKGROUND

The present disclosure is generally related to touch screens, and more particularly to systems and methods for determining a touch position on a touch screen.

U.S. Pat. No. 5,951,397 to Dickinson, entitled "Gaming Machine and Method Using Touch Screen," described a gaming machine having a touch screen applied to an outer face of a cathode ray tube (CRT). The touch screen comprised a transparent panel (touch panel) which was curved and shaped to correspond to the curvature and shape of the CRT screen surface to which it was applied. U.S. Pat. No. 5,951,397 explains that one type of touch panel that could be used was fitted with a number of relatively short (e.g., one-inch or so in length), mostly linear, spaced-apart electrodes arranged in one to three spaced-apart, peripheral lines along the perimeter of the touch screen. A controller board was coupled to the touch panel and included a touch screen processor, an analog-to-digital converter (ADC) and other electronic components which were appropriately connected with the electrodes so that the location at which a person touched the screen could be sensed by the electrodes. Then, a signal corresponding to the location was generated which was further used to execute specific commands for playing a game. A message was generated by the CRT display beneath the touch panel to inform the player of the command corresponding to the location on the touch panel.

U.S. Pat. No. 5,796,389 to Bertram et al., entitled "Reduced Noise Touch Screen Apparatus and Method," described a touch screen apparatus including four electrodes, each in the shape of a conductive bus bar, that were positioned along the edges of the touch screen. Four conductive wires were coupled to electrodes. The four electrodes could be silk screen directly onto a screen of a display (e.g., a CRT), and a conductive coating could be applied over the electrodes and the screen of the display. A sinusoidal signal was applied to the electrodes via the conductive wires. When a person touched the conductive coating, a small amount of current would flow from the electrodes, through the person's body, and to ground. The amount of current flowing from a given electrode was generally dependent upon the distance of the touch position from the given electrode. Thus, the amount of current flowing through each of the electrodes was used to calculate a position of a touch.

Four operational amplifiers (op amps) were used to sense the four currents flowing from the four electrodes. The outputs of the four op amps were filtered by four corresponding bandpass filters that acted to reject noise. The outputs of the four bandpass filters were then provided to an ADC, and an output of the ADC corresponding to the outputs of the four bandpass filters was provided to a central processing unit (CPU).

The CPU then determined when a touch occurred by detecting peaks in the outputs from the bandpass filters, and determining whether the peaks exceeded a threshold. When a touch was detected, the system took four samples from each of the four outputs of the bandpass filters. Then, these samples were used to calculate a touch position. Next, the calculated touch position was adjusted using predetermined parameters to account for nonlinear characteristics of the touch screen system.

SUMMARY

In one aspect, a method for determining a position of a touch on a touch screen is provided. The method may include providing a first sinusoidal signal to a first electrode on a touch screen, the first sinusoidal signal having a frequency. The method also may include sensing a signal flowing from the first electrode to generate a first sensed signal. The method additionally may include multiplying the first sensed signal by a second sinusoidal signal to generate a first multiplied signal, the second sinusoidal signal having the frequency, the second sinusoidal signal having a phase. The method further may include multiplying the first sensed signal by a third sinusoidal signal to generate a second multiplied signal, the third sinusoidal signal having the frequency, the third sinusoidal signal having a phase different from the phase of the second sinusoidal signal by 90 degrees. The method still further may include filtering the first multiplied signal to generate a first filtered signal, and filtering the second multiplied signal to generate a second filtered signal. The method also may include generating an estimated touch position based on the first filtered signal and the second filtered signal.

In another aspect, an apparatus for determining a position of a touch on a touch screen is provided. The apparatus may comprise a first sinusoid generator coupled to a first electrode of a touch screen, the first sinusoid generator adapted to generate a first sinusoidal signal having a frequency, and a first sensor coupled to the first electrode to generate a first sensed signal indicative of a signal flowing from the first electrode. The apparatus additionally may comprise a first multiplier having a first input coupled to the first sensor, a second input coupled to receive a second sinusoidal signal having the frequency and a phase, and an output. The apparatus also may comprise a second multiplier having a first input coupled to the first sensor, a second input coupled to receive a third sinusoidal signal having the frequency and a phase 90 degrees out of phase with the phase of the second sinusoidal signal, and an output. The apparatus further may comprise a first low pass filter having an input and an output, the input of the first low pass filter coupled to the output of the first multiplier, and a second low pass filter having an input and an output, the input of the second low pass filter coupled to the output of the second multiplier. The apparatus still further may comprise a first amplitude calculator having a first input, a second input, and an output, wherein the first input of the first amplitude calculator is coupled to the output of the first low pass filter, and wherein the second input of the first amplitude calculator is coupled to the output of the second low pass filter. Additionally, the apparatus may comprise a touch position calculator having a first input coupled to the output of the amplitude calculator, wherein the touch position calculator is adapted to generate an estimate of a touch position based on the output of the amplitude calculator.

In yet another aspect, a method for facilitating game play via a gaming apparatus is provided, the gaming apparatus comprising a value input device, a display unit, and a touch screen unit. The method may include receiving a value input from a player via the value input device, and causing the display unit to display a first game display relating to one of the following games: poker, blackjack, slots, keno or bingo. The method also may include receiving player input data via the touch screen unit, and determining a value payout associated with an outcome of the game. Receiving player input data via the touch screen unit may comprise providing a first sinusoidal signal to a first electrode on a touch screen associated with the touch screen unit, the first sinusoidal signal having a frequency, and sensing a signal flowing from the first electrode to generate a first sensed signal. Receiving player input data via the touch screen unit also may comprise multiplying the first sensed signal by a second sinusoidal signal to generate a first multiplied signal, the second sinusoidal signal having the frequency, the second sinusoidal signal having a phase. Receiving player input data via the touch screen unit additionally may comprise multiplying the first sensed signal by a third sinusoidal signal to generate a second multiplied signal, the third sinusoidal signal having the frequency, the third sinusoidal signal having a phase different from the phase of the second sinusoidal signal by 90 degrees. Receiving player input data via the touch screen unit further may comprise filtering the first multiplied signal to generate a first filtered signal, and filtering the second multiplied signal to generate a second filtered signal. Receiving player input data via the touch screen unit still further may comprise generating an estimated touch position based on the first filtered signal and the second filtered signal.

In still another aspect, a gaming apparatus is provided. The gaming apparatus may comprise a display unit, and a value input device. The gaming apparatus additionally may comprise a touch screen unit. The touch screen unit may include a sinusoid generator coupled to a first electrode of a touch screen, the sinusoid generator adapted to generate a first sinusoidal signal having a frequency, and a first sensor coupled to the first electrode to generate a first sensed signal indicative of a signal flowing from the first electrode. The touch screen unit also may include a first multiplier having a first input coupled to the first sensor, a second input coupled to receive a second sinusoidal signal having the frequency and a phase, and an output. The touch screen unit additionally may include a second multiplier having a first input coupled to the first sensor, a second input coupled to receive a third sinusoidal signal having the frequency and a phase 90 degrees out of phase with the phase of the second sinusoidal signal, and an output. Further, the touch screen unit may include a first low pass filter having an input and an output, the input of the first low pass filter coupled to the output of the first multiplier, and a second low pass filter having an input and an output, the input of the second low pass filter coupled to the output of the second multiplier. Still further, he touch screen unit also may include a first amplitude calculator having a first input, a second input, and an output, wherein the first input of the first amplitude calculator is coupled to the output of the first low pass filter, and wherein the second input of the first amplitude calculator is coupled to the output of the second low pass filter, and a touch position calculator having a first input coupled to the output of the amplitude calculator, wherein the touch position calculator is adapted to generate an estimate of a touch position based on the output of the amplitude calculator. The gaming apparatus may also comprise a main controller operatively coupled to the display unit, the value input device, and the touch screen unit, the main controller comprising a main processor and a main memory operatively coupled to the main processor. The controller may be programmed to receive value input data via the value input device, and to cause the display unit to generate a first game display relating to one of the following games: poker, blackjack, slots, keno or bingo. The controller may be programmed to receive player input data via the touch screen unit, and to determine a value payout associated with an outcome of the game.

Additional aspects are defined by the claims of this patent.

Detailed Description of Various Embodiments

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
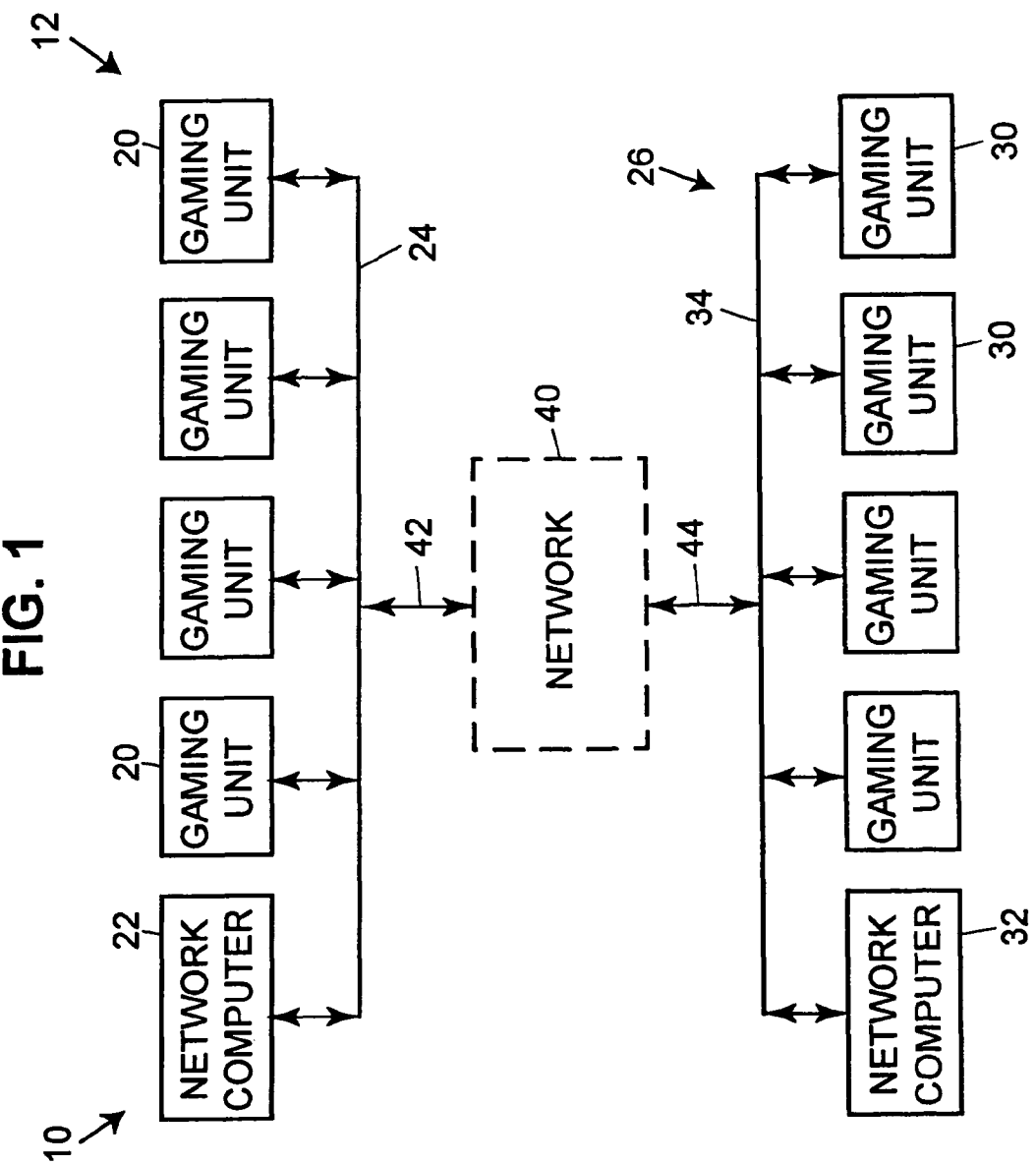
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Figure 2:
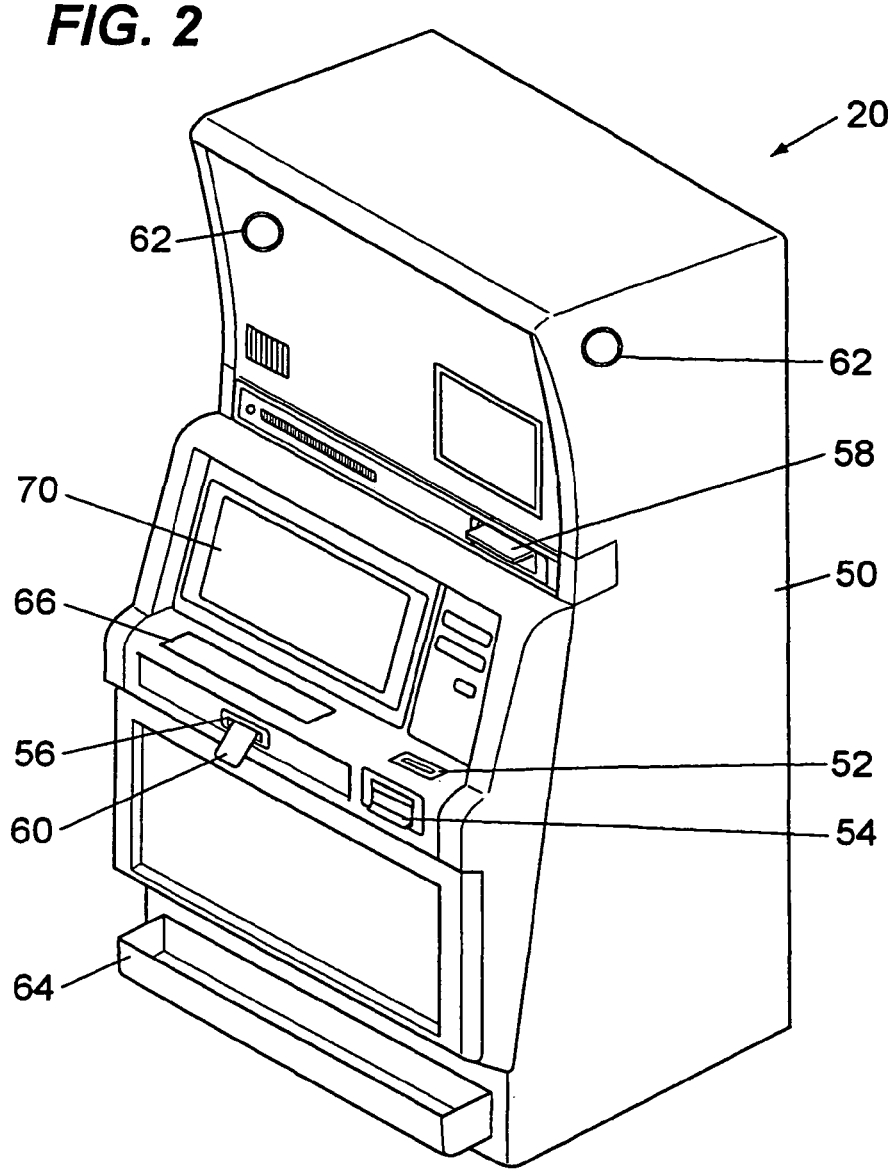
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, a display unit 68, and a touch screen overlaying a screen of the display unit 68. The display unit 68 may be, for example, a color video display unit or a monochrome display unit that displays images relating to the particular game or games. The display unit 68 may comprise, for example, a cathode ray tube (CRT), a liquid crystal display (LCD), a light emitting diode (LED) display, a plasma display, a vacuum fluorescent display, etc. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
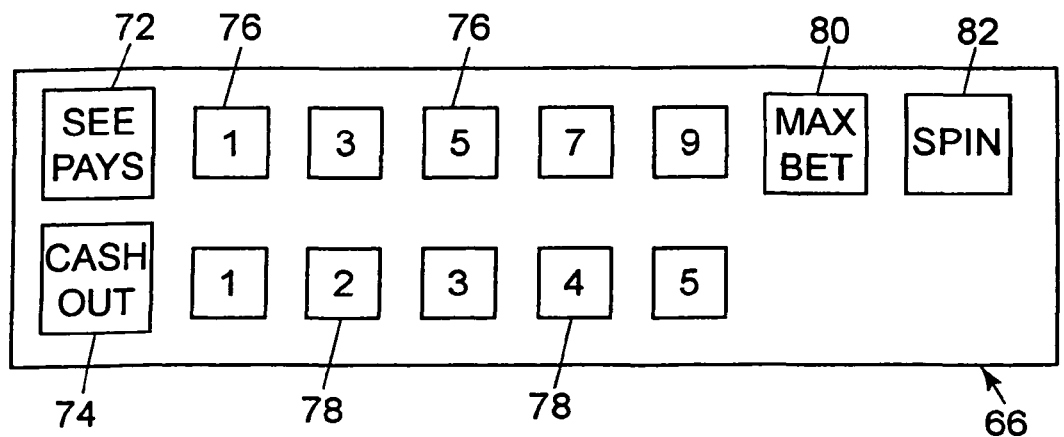
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. If the display unit 68 is provided in the form of a video display unit, the control panel 66 may include a "See Pays" button 72 that, when activated, causes the display unit 68 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the display unit 68 is provided as a video display unit, the control panel 66 could be generated by the display unit 68. In that case, each of the buttons of the control panel 66 could be a colored area generated by the display unit 68, and some type of mechanism may be associated with the display unit 68 to detect when each of the buttons was touched, such as a touch screen.

In general, a button on a gaming unit 20 may include a mechanical button or an area on a display screen differentiated by a line or lines, color, shade, etc., in conjunction with a touch screen to detect whether the area was touched (a "touch screen button"). Thus, as used herein, the term "button" may include a mechanical button or a touch screen button.

Gaming Unit Electronics

Figure 3:
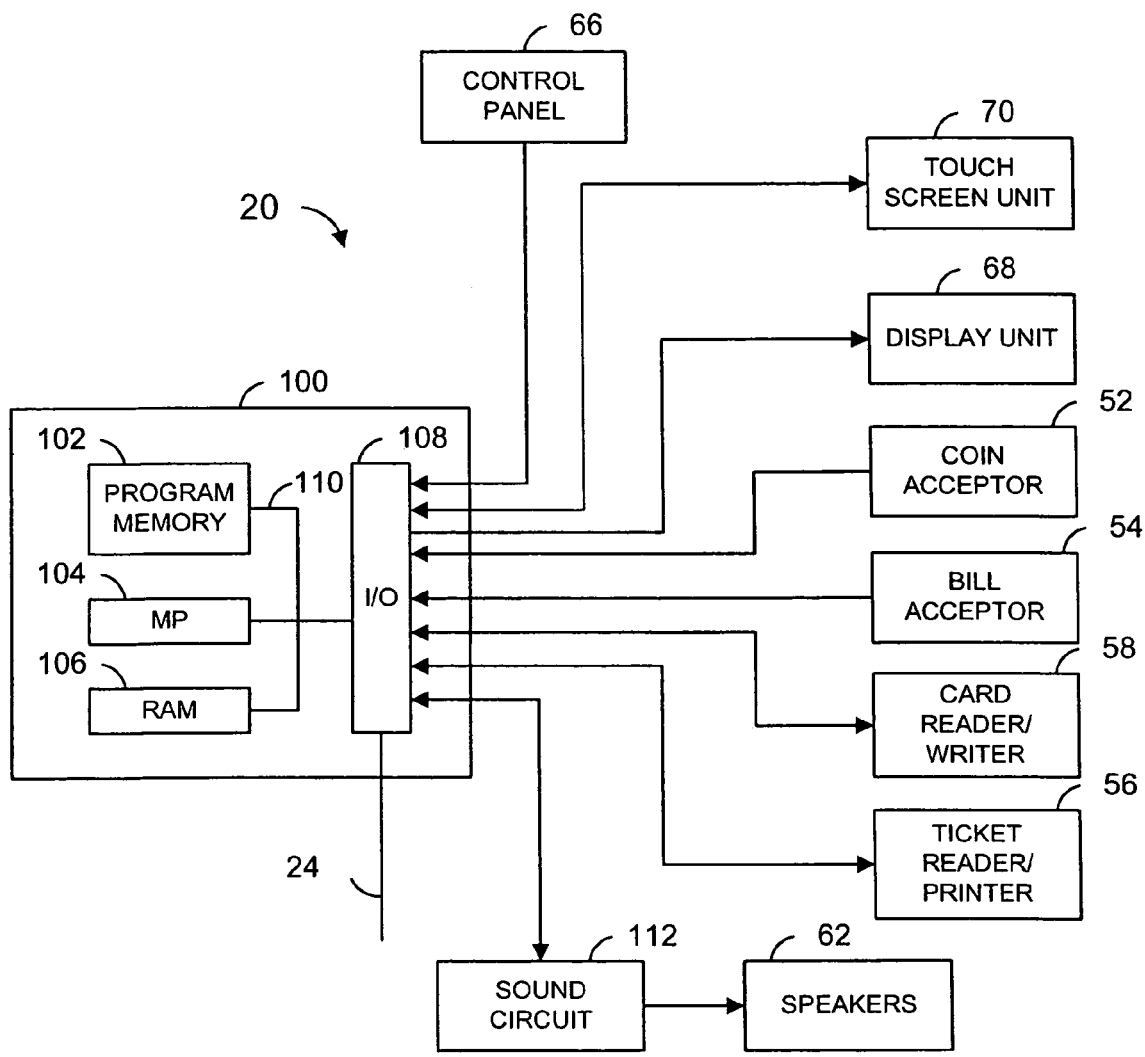
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses. The gaming unit 20 may also include a touch screen unit 70, which subsequently will be described in more detail.

FIG. 3 illustrates that the control panel 66, the coin acceptor 52, the bill acceptor 54, the ticket reader/printer 56, the card reader 58, the display unit 68, and the touch screen unit 70, may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 68, 70, and 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
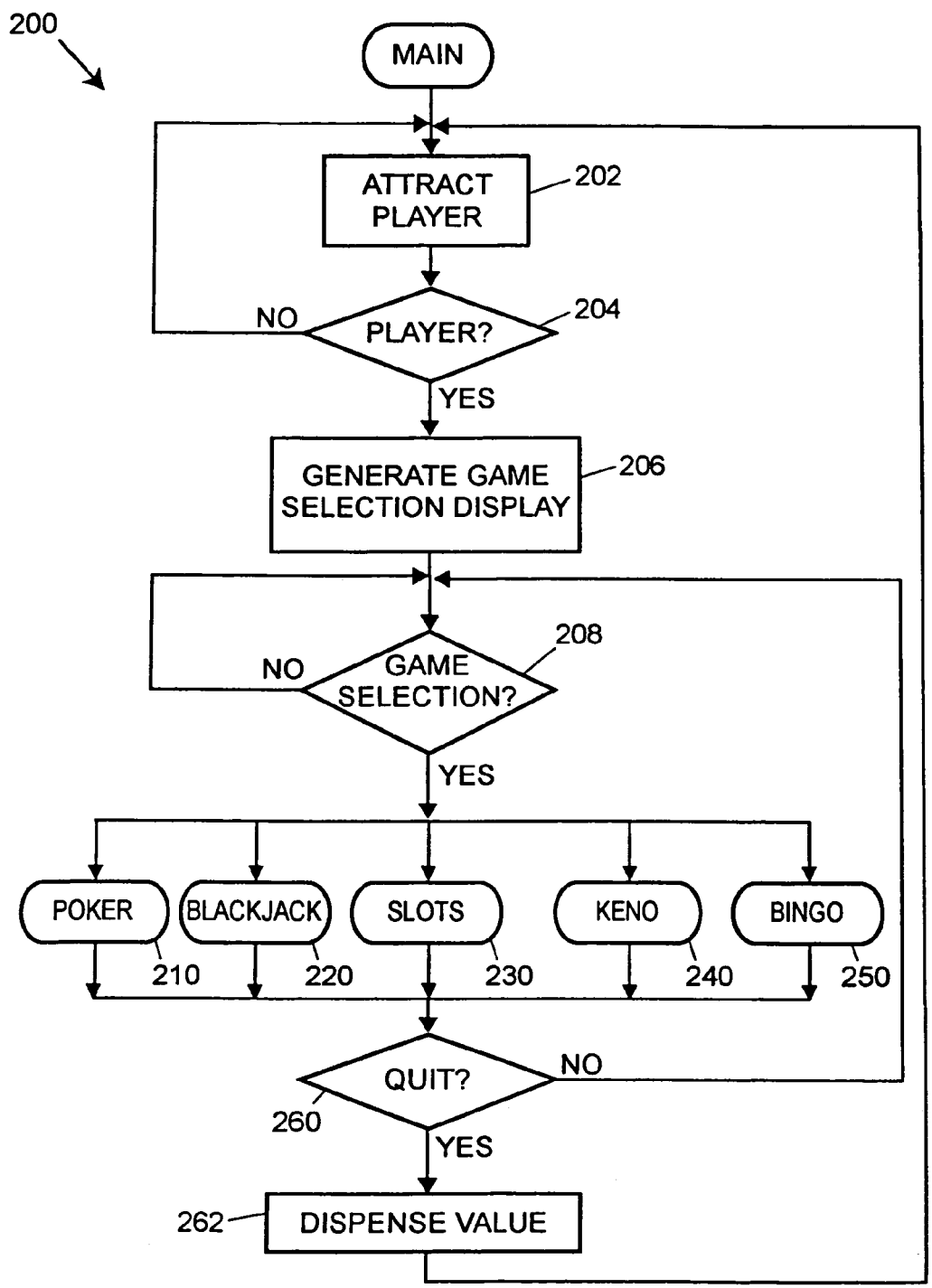
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 68 (if provided as a video display unit) and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 68 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
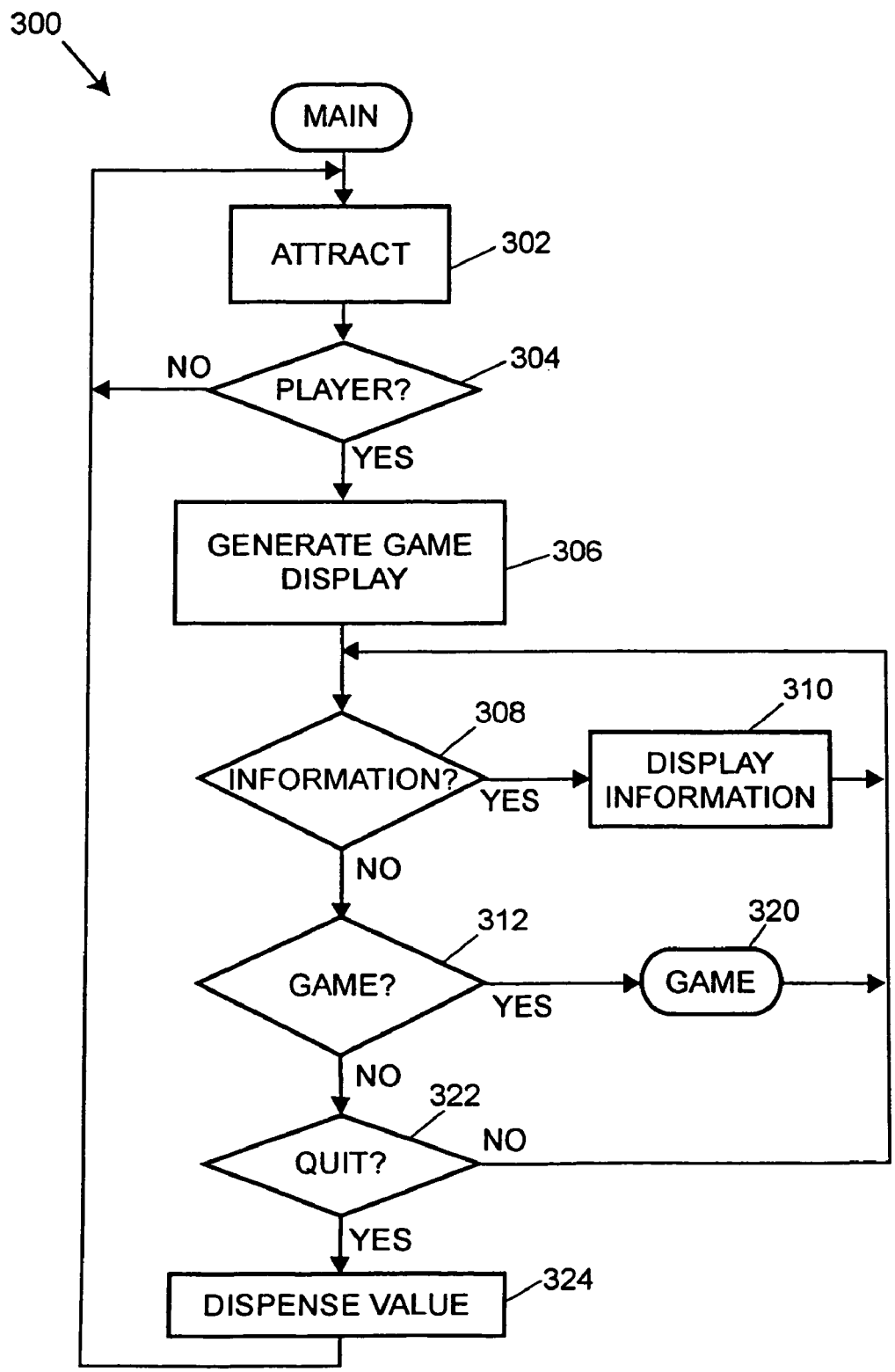
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 68 (if provided as a video display unit) and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 68 (if provided as a video display unit) at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed.

The game routine 320 could be any one of the game routines disclosed herein, such as one of the five game routines 210, 220, 230, 240, 250, or another game routine. After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Figure 6:
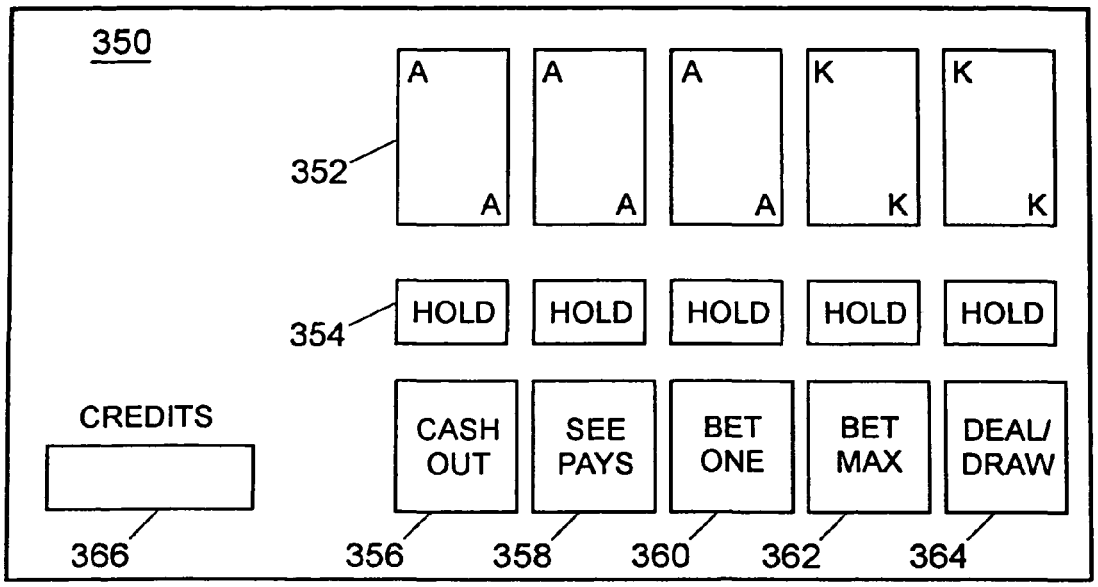
FIG. 6 is an illustration of an embodiment of a visual display that may be displayed during performance of the video poker routine of FIG. 8.

Video Poker

Where the gaming unit 20 is designed to facilitate play of a video poker game, the display unit 68 may comprise a video display unit. FIG. 6 is an exemplary display 350 that may be shown on the display unit 68 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. The buttons 354, 356, 358, 360, 362, 364 may form part of the video display 350, or one or more of those buttons may be provided as part of a control panel that is provided separately from the display unit 68.

Figure 8:
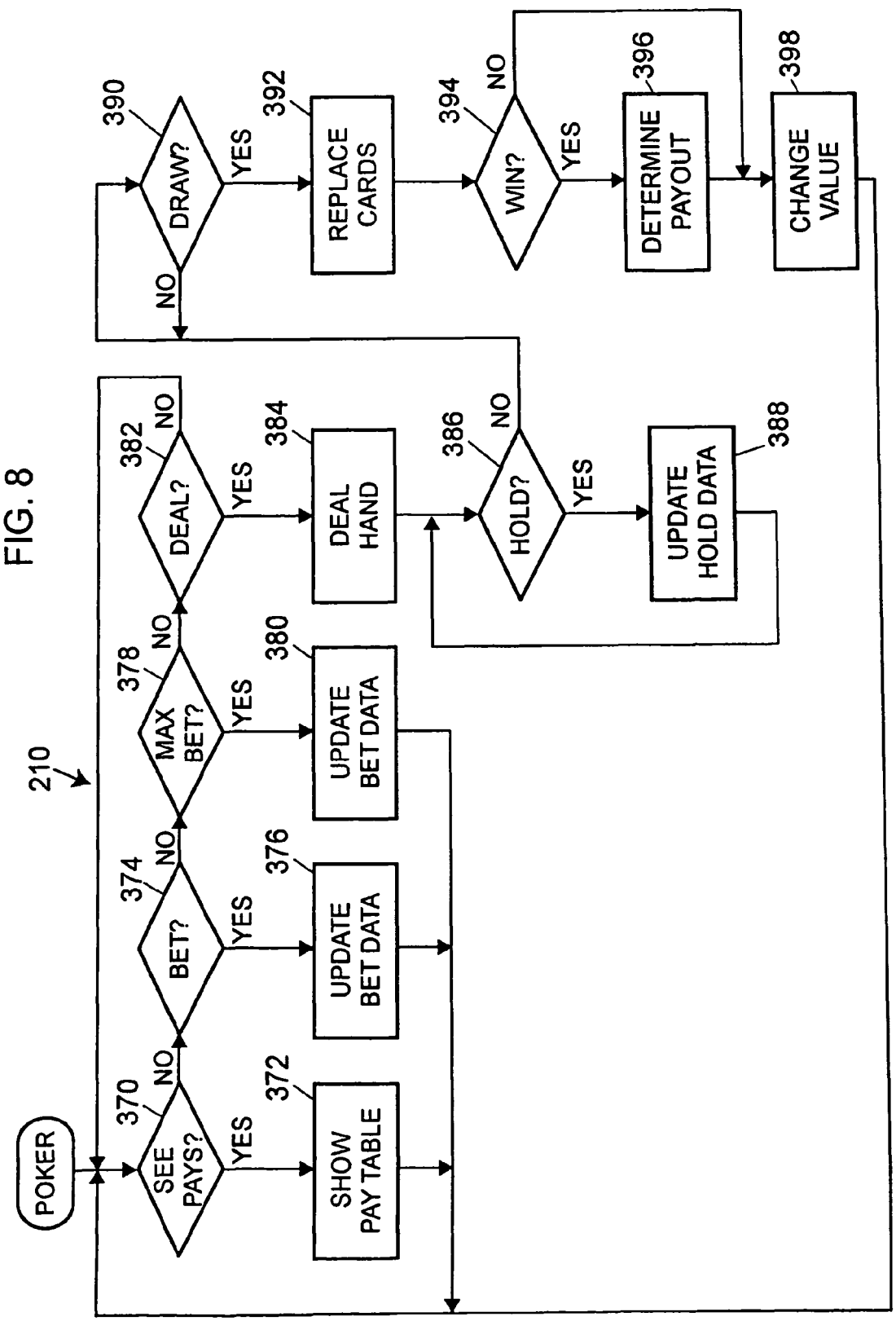
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 68. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 68 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 7:
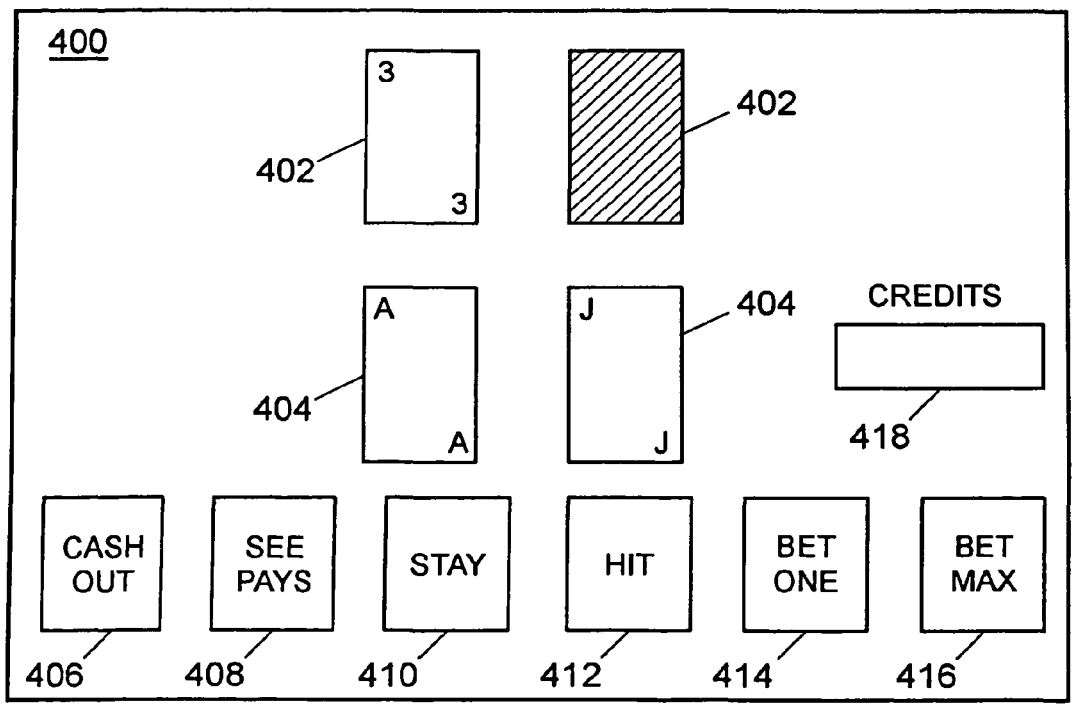
FIG. 7 is an illustration of an embodiment of a visual display that may be displayed during performance of the video blackjack routine of FIG. 9.

Video Blackjack

Where the gaming unit 20 is designed to facilitate play of a video blackjack game, the display unit 68 may comprise a video display unit. FIG. 7 is an exemplary display 400 that may be shown on the display unit 68 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. The buttons 406, 408, 410, 412, 414, 416 may form part of the video display 400, or one or more of those buttons may be provided as part of a control panel that is provided separately from the display unit 68.

Figure 9:
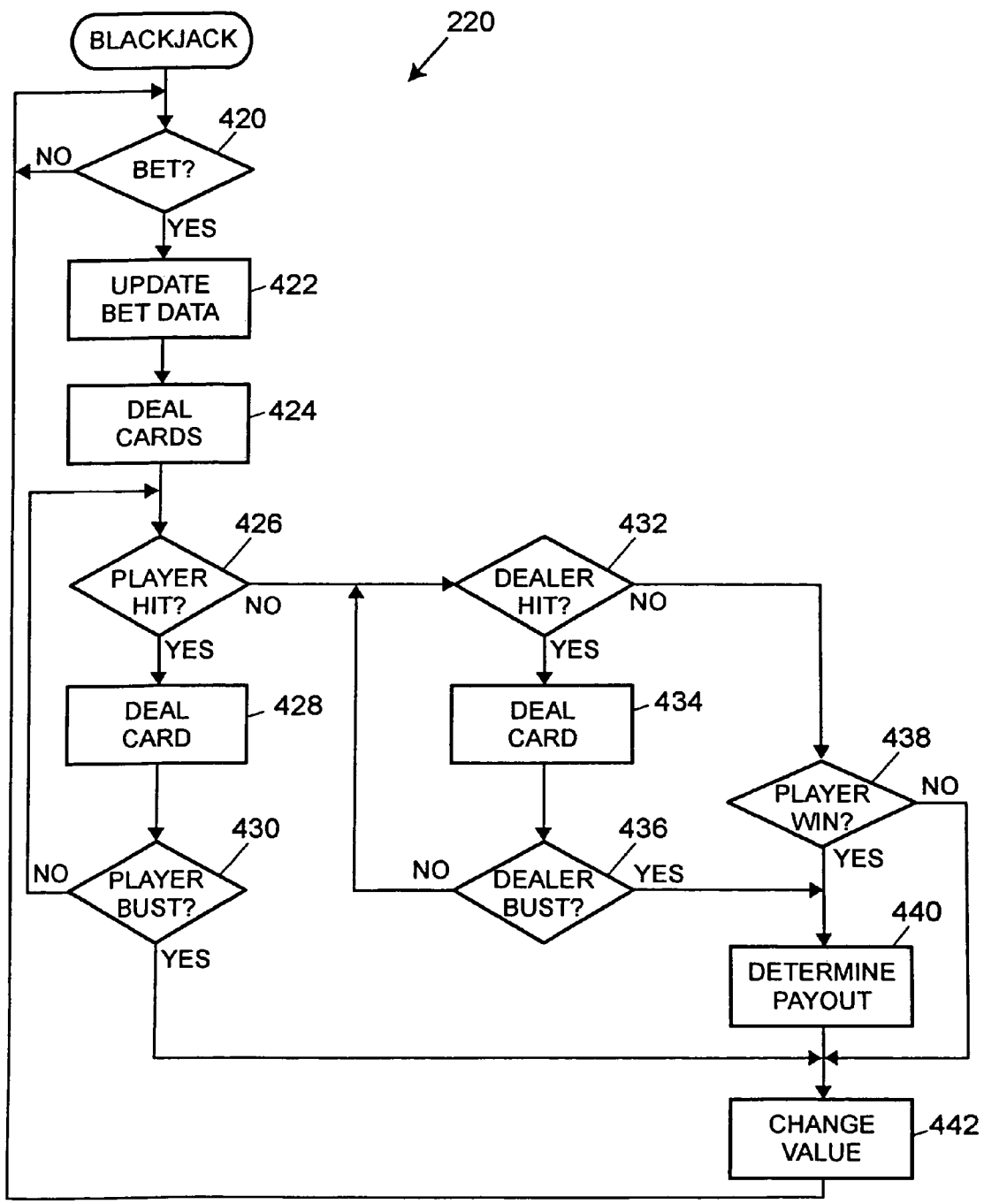
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 68.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Figure 10:
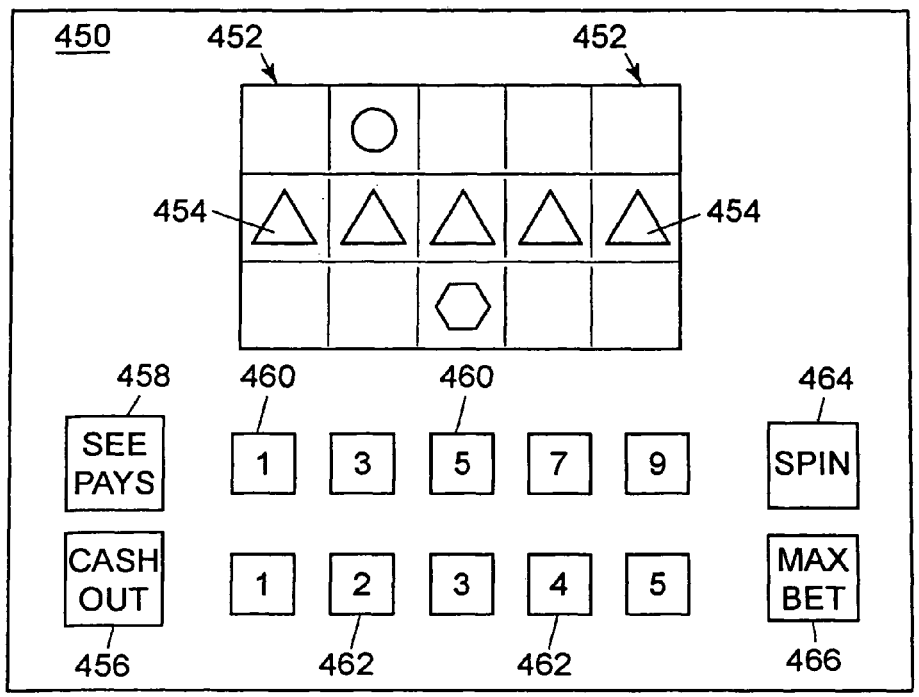
FIG. 10 is an illustration of an embodiment of a visual display that may be displayed during performance of the slots routine of FIG. 12.

Slots

Where the gaming unit 20 is designed to facilitate play of a video slots game, the display unit 68 may comprise a video display unit. FIG. 10 is an exemplary display 450 that may be shown on the display unit 68 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
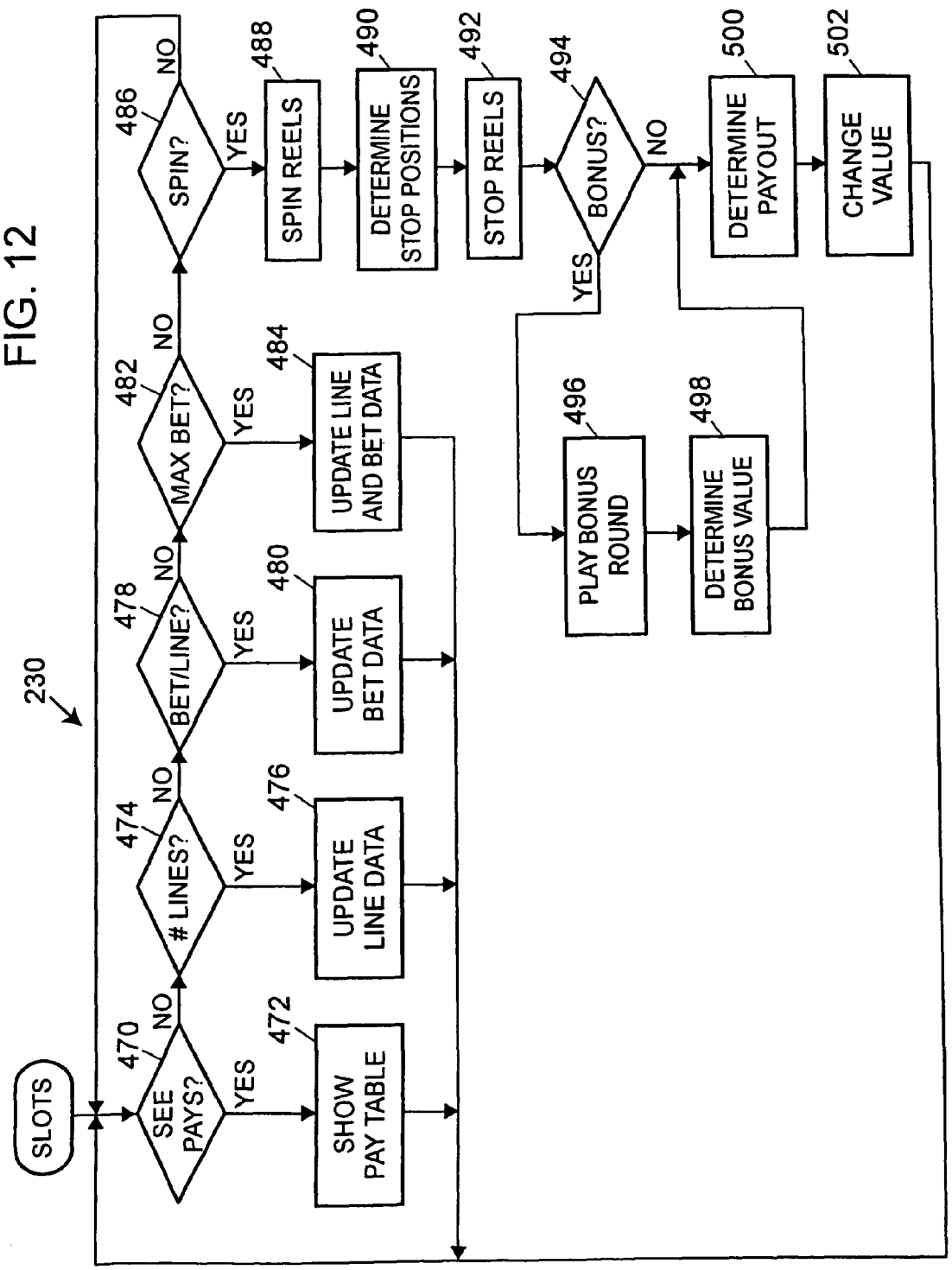
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 68. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 68, actual slot machine reels that are capable of being spun may be utilized instead, in which case the display unit 68 could be provided in the form of a plurality of mechanical reels that are rotatable, each of the reels having a plurality of reel images disposed thereon.

Figure 11:
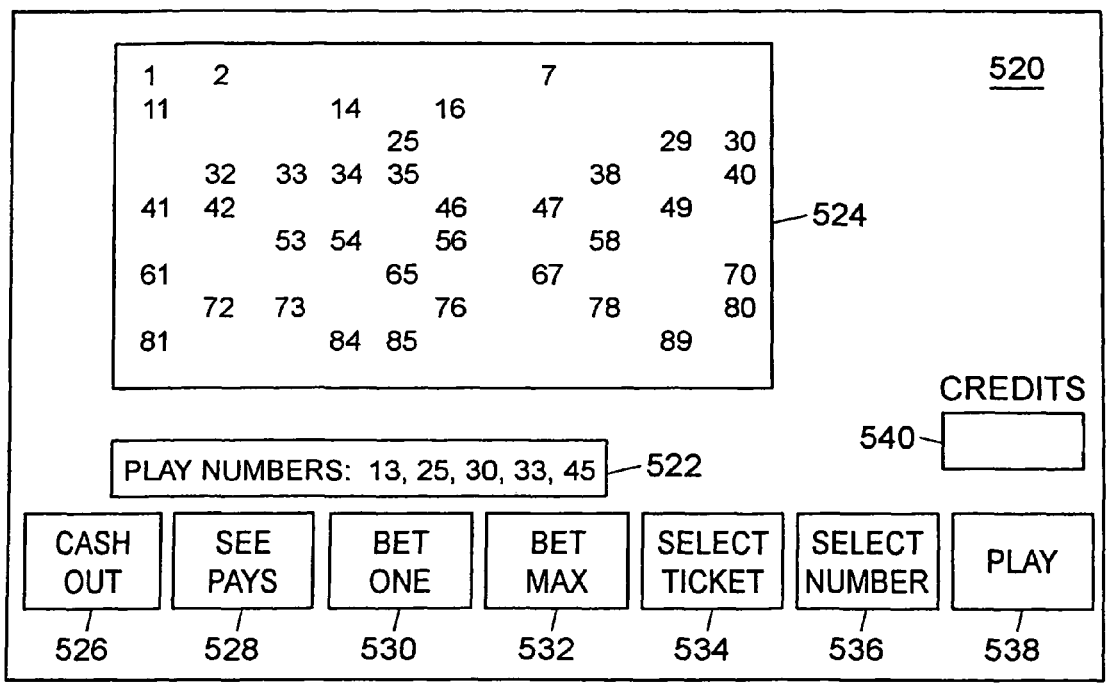
FIG. 11 is an illustration of an embodiment of a visual display that may be displayed during performance of the video keno routine of FIG. 13.

Video Keno

Where the gaming unit 20 is designed to facilitate play of a video keno game, the display unit 68 may comprise a video display unit. FIG. 11 is an exemplary display 520 that may be shown on the display unit 68 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. The buttons 526, 528, 530, 532, 534, 536, and 538 may form part of the video display 520. Alternatively, one or more of those buttons may be provided as part of a control panel that is provided separately from the display unit 68.

Figure 13:
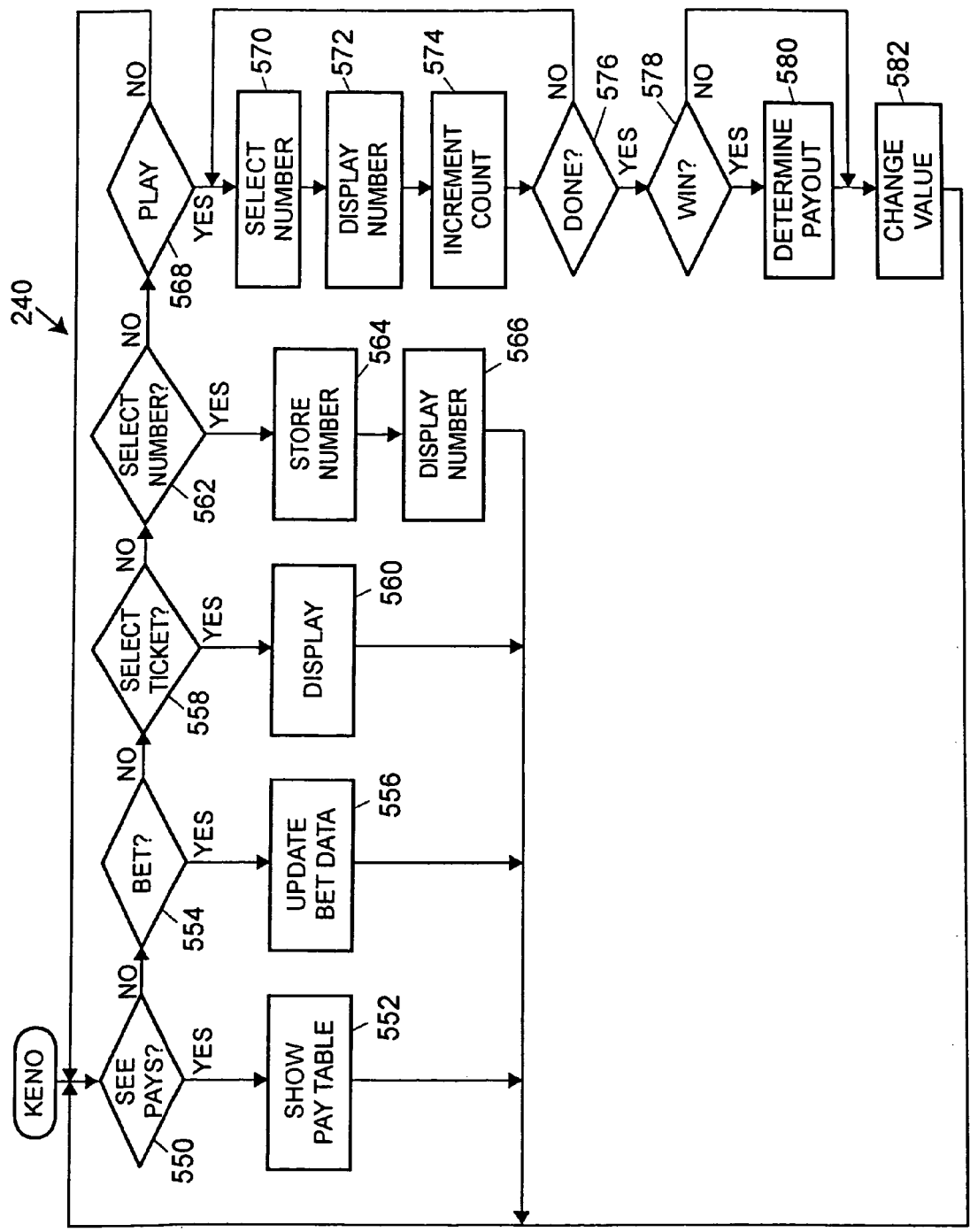
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 68. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 68 and the display units 68 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Figure 14:
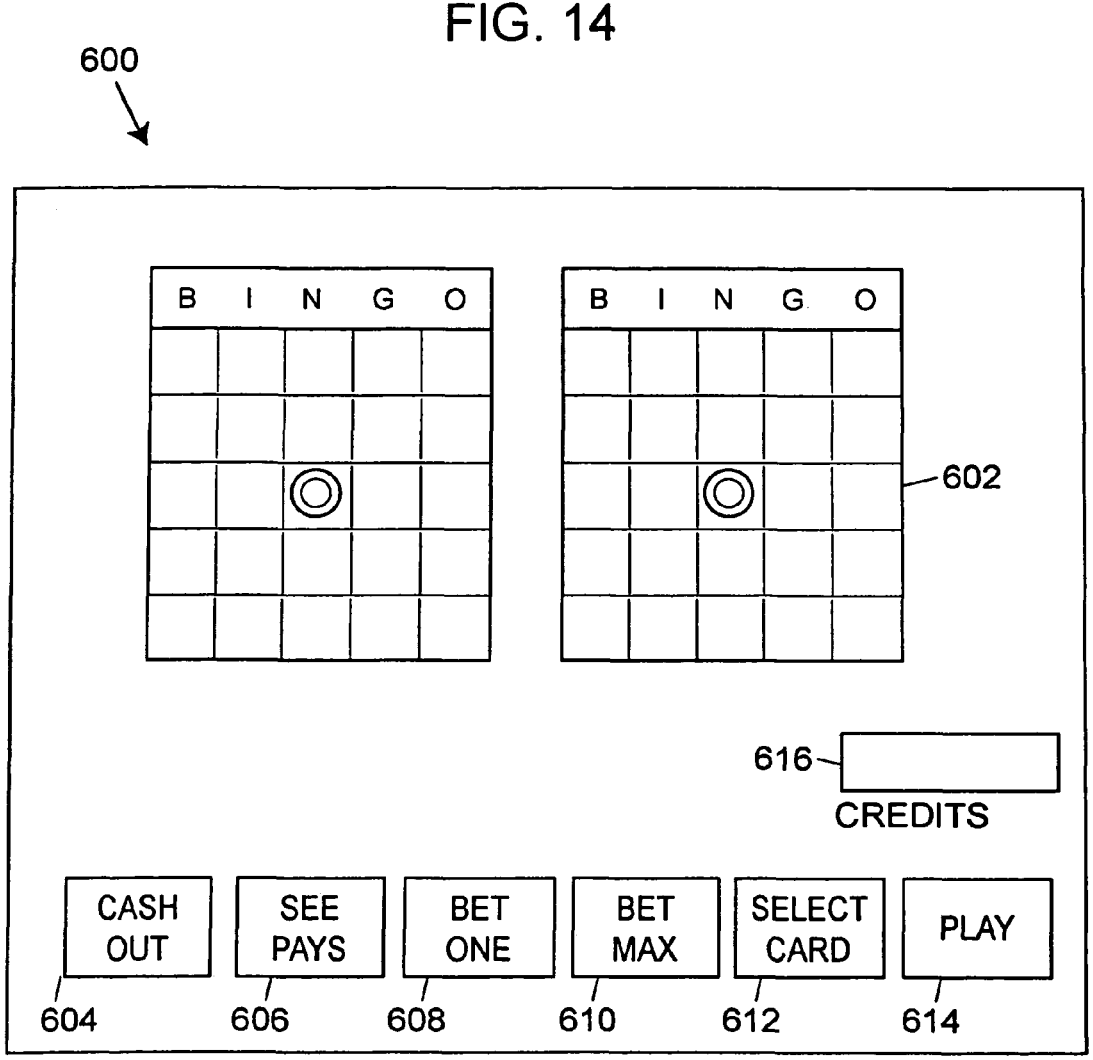
FIG. 14 is an illustration of an embodiment of a visual display that may be displayed during performance of the video bingo routine of FIG. 15.

Video Bingo

Where the gaming unit 20 is designed to facilitate play of a video bingo game, the display unit 68 may comprise a video display unit. FIG. 14 is an exemplary display 600 that may be shown on the display unit 68 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. The buttons 604, 606, 608, 610, 612, and 614 may form part of the video display 600, or one or more of those buttons may be provided as part of a control panel that is provided separately from the display unit 68.

Figure 15:
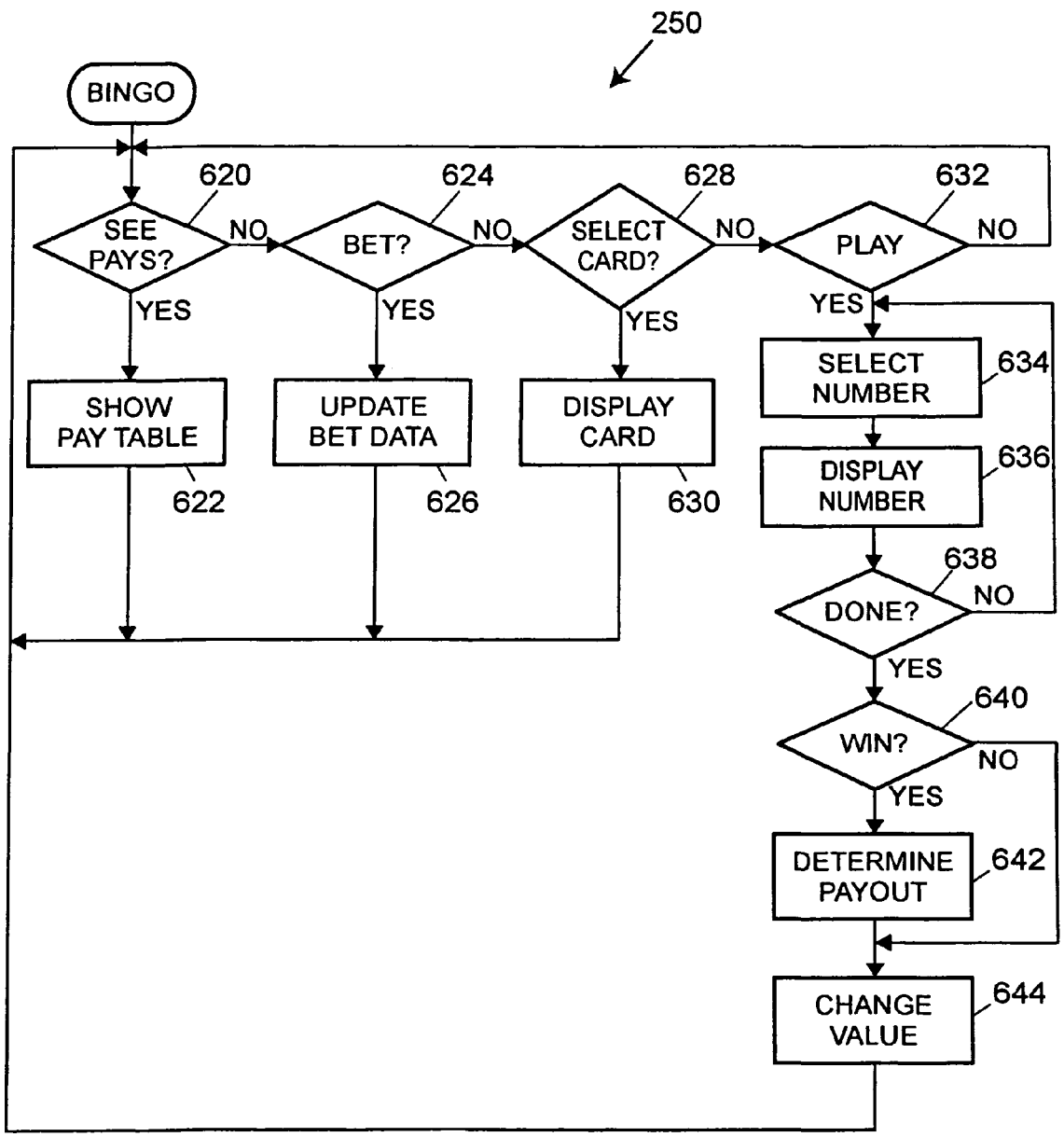
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 68. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 68 and the display units 68 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Touch Screen Unit

Figure 16:
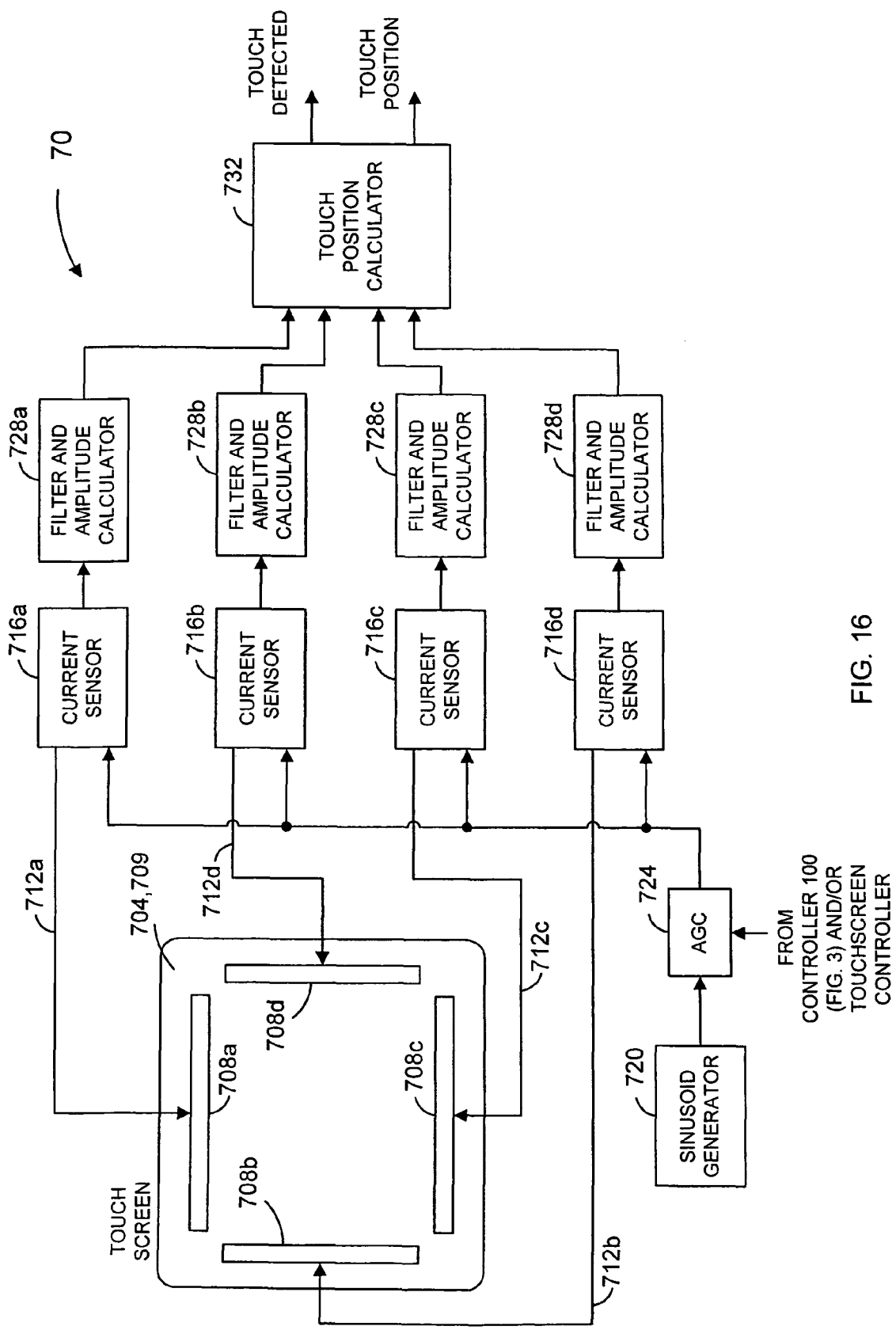
FIG. 16 is a block diagram of one embodiment of one embodiment of the touch screen unit shown schematically in FIG. 3.

FIG. 16 is a block diagram of one embodiment of a touch screen unit 70 shown schematically in FIG. 3. The touch screen unit 70 may determine whether a touch has occurred and, if so, a position at which the touch occurred (the "touch position"). The touch screen unit 70 may send information indicative of the touch position to, for example, the controller 100 of FIG. 3. The information indicative of the touch position may include 2-dimensional position information such as rectangular coordinates, polar coordinates, etc., of the touch position. In some embodiments, 1-dimensional touch position information may be adequate, and, thus, the information indicative of the touch position may include 1-dimensional position information.

The touch screen unit 70 may comprise a conductive coating 704 and electrodes 708a, 708b, 708c, and 708d, and a transparent insulating layer 709 comprising, for example, silicon dioxide or the like, overlaid on a screen of the display unit 68 (FIGS. 2 and 3). The conductive coating 704, electrodes 708, and transparent insulating layer 709 may be overlaid on the screen of the display unit 68 using a variety of techniques, including known techniques. In the embodiment of FIG. 16, each of the electrodes 708 may have a rectangular shape and may be positioned proximate to and along a respective edge of the screen of the display unit 68. Different types of electrodes and different configurations can be used as well. For example, electrodes of a different shape could be used, and/or could be positioned proximate to the corners of the screen of the display unit 68. As another example, a lesser or greater number of electrodes could be used (e.g., 1, 2, 3, 5, 6, etc.).

The touch screen unit 70 may also comprise conductors 712a, 712b, 712c, and 712d and current sensors 716a, 716b, 716c, and 716d. Each of the electrodes 708 may be coupled to a respective one of the conductors 712, and each of the conductors 712 also may be coupled to a respective one of the current sensors 716. A sinusoid generator 720 may be coupled to an automatic gain control circuit (AGC) 724, and an output of the AGC 724 may be coupled to the conductors 712 via the current sensors 716. The AGC 724 may receive control information from the controller 100 (FIG. 3) and/or a touch screen controller. An embodiment of a touch screen controller will be described below. In some embodiments, the AGC 724 may not be controlled by the controller 100 or a touch screen controller.

The touch screen unit 70 may additionally comprise filters and amplitude calculators 728a, 728b, 728c, and 728d. Respective outputs of the current sensors 716 may be coupled to respective inputs of the filters and amplitude calculators 728. Further, outputs of the filters and amplitude calculators 728 may be coupled to a touch position calculator 732.

In other embodiments, a plurality of sinusoid generators may be used. For example, four separate sinusoid generator may be coupled to respective conductors 712 via the current sensors 716.

In operation, the output of the sinusoid generator 720 may comprise a generally sinusoidal signal which may be gain controlled by the AGC 724. The generally sinusoidal signal may have a frequency ω. As just one example, the sinusoid generator 720 may comprise a clock generator and a filter to filter the output of the clock generator. The generally sinusoidal signal is provided to the electrodes 708 via the conductors 712 and the current sensors 716.

If a person is not touching the insulated conductive coating 704, current will not generally flow from the conductors 712. If the person does touch the insulated conductive coating 704 with a finger, however, a small amount of current corresponding to the signal generated by the signal generator 720 will pass through the person's body to ground. The amount of current flowing from each one of the electrodes 708, and thus from each one of the conductors 712, is generally a function of the distance of the touch from the electrode 708 corresponding to the conductor 712. In particular, the amount of current should generally increase as the touch gets closer to the electrode 708. For example, if the conductive coating has a generally uniform resistivity and if a person touches a point equidistant from each of the electrodes 708, the amount of current flowing from each of the conductors 712 should be approximately equal. On the other hand, if the touch is closer to electrode 708a than the other electrodes 708, the amount of current flowing from the conductor 712a should be larger than the amounts a current flowing from the other conductors 712. As will be described in more detail below, by measuring the amounts of current flowing from the conductors 712, a touch may be detected and an estimate of the position of the touch may be generated.

The current sensors 716 each generate a signal that is indicative of the current flowing in the corresponding conductor 712. These signals generally may comprise sinusoidal signals having the same frequency (ω) as that of the output of the sinusoid generator 720. The amplitude of each of the signals generated by the current sensors 716, however, may vary depending on, for example, whether a person has touched the touch screen and the position of a touch. Additionally, the phase of each of the signals generated by the current sensors 716 may be different than that of the output of the sinusoid generator 720 and/or one or more of the signals generated by the other current sensors 716.

The signals generated by the current sensors 716 are provided to respective filters and amplitude calculators 728. Each filter and amplitude calculator 728 generates a signal that is indicative of the amplitude of the current flowing in the respective conductor 712. The amplitude signals are provided to the touch position calculator 732 which generates an indication of whether a touch was detected, as well as an estimate of the touch position corresponding to a detected touch. The touch position calculator 732 need not generate separate signals corresponding to the indication that a touch was detected and the estimate of the touch position. For example, the estimate of the touch position may itself be the indication that a touch was detected.

Figure 17:
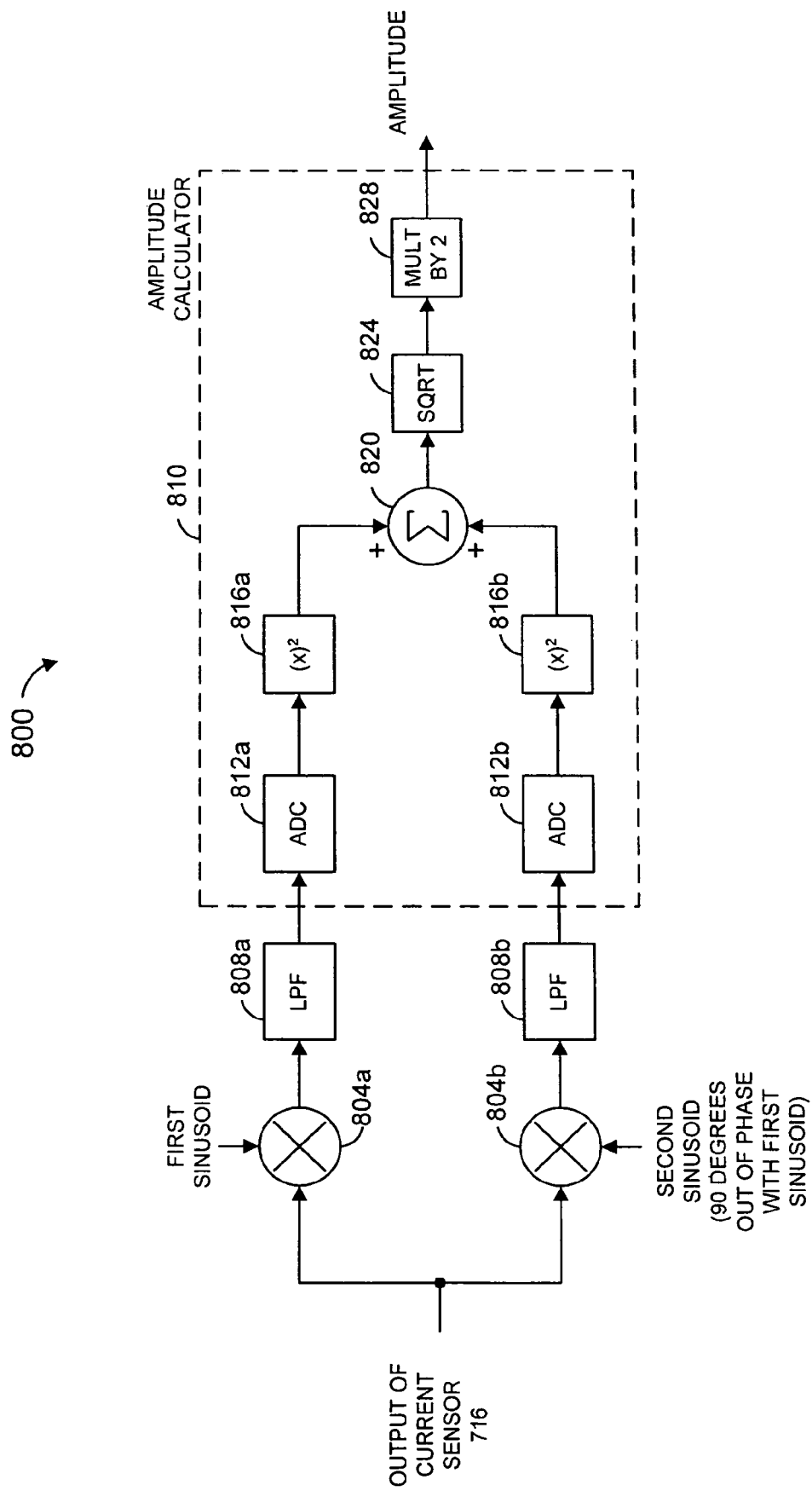
FIG. 17 is a block diagram of one embodiment of the filter and amplitude calculator shown schematically in FIG. 16.

FIG. 17 is a block diagram of one embodiment of a filter and amplitude calculator 728 shown schematically in FIG. 16. The filter and amplitude calculator 728 receives a signal from a current sensor 716 (FIG. 16) and may generate a digital signal indicative of the amplitude of the signal from the current sensor 716.

The filter and amplitude calculator 728 may comprise a multiplier 804a coupled to a low pass filter (LPF) 808a, and a multiplier 804b coupled to a LPF 808b. The multiplier 804a may multiply the output of the current sensor 716 by a first sinusoidal signal having a frequency ω. Similarly, the multiplier 804b may multiply the output of the current sensor 716 by a second sinusoidal signal having a frequency ω. Additionally, the second sinusoidal signal is 90 degrees out of phase with the first sinusoidal signal.

It will be understood by those of ordinary skill in the art that, in actual implementations, the frequency of the first sinusoidal signal and the frequency of the second sinusoidal frequency may not be exactly the same as ω. For instance, the frequencies of the first sinusoidal signal and the second sinusoidal signal may differ slightly from ω. For example, if the first sinusoidal signal and the second sinusoidal signal are generated using one or two sinusoid generators that are different from the sinusoid generator 720, then the frequencies of the first sinusoidal signal and the second sinusoidal signal may be slightly different than ω. In some embodiments, the frequencies of the first sinusoidal signal and the second sinusoidal signal may be exactly ω, if, for example, the sinusoid generator 720 is used to generate the first sinusoidal signal and the second sinusoidal signal. In general, performance of a touch screen unit will improve as the frequencies of the first sinusoidal signal and the second sinusoidal signal approach ω. If a sinusoidal signal is described herein as having a particular frequency, it will be understood that the frequency of the sinusoidal signal may be exactly the same as, or slightly different from, the particular frequency.

Similarly, it will be understood by those of ordinary skill in the art that, even though the phase of the second sinusoidal signal is described as being different from the phase of the first sinusoidal signal by 90 degrees, the difference between the two phases may be slightly different than 90 degrees. In general, performance of a touch screen unit will improve as the difference between the phases of the first sinusoidal signal and the second sinusoidal signal approach 90 degrees. If a sinusoidal signal is described herein as having a phase that is different from the phase of another sinusoidal signal by 90 degrees, it will be understood that the phase difference may be exactly 90 degrees, or slightly different from 90 degrees.

The LPFs 808 may filter the respective outputs of the multipliers 804, and provide outputs to an amplitude calculator 810. The amplitude calculator may comprise an analog-to-digital converter (ADC) 812a, an ADC 812b, a squaring calculator 816a, a squaring calculator 816b, a summer 820, a square root calculator 824, and a multiply-by-two calculator 828.

The output of the LPF 808a may be coupled to the ADC 812a, and the output of the LPF 808b may be coupled to the ADC 812b. The ADCs 812 may convert the respective analog outputs of the LPFs 808 to respective digital values.

An output of the ADC 812a may be coupled to the squaring calculator 816a, and an output of the ADC 812b may be coupled to the squaring calculator 816b. The squaring calculators 816 may generate squared values of the respective outputs of the ADCs 812. In other words, if the input to a squaring calculator 816 is X, the output of the squaring calculator 816 may be $X^2$.

The outputs of the squaring calculators 816 may be coupled to the summer 820 which adds the outputs of the squaring calculators 816 together. The output of the summer 820 may be coupled to the square root calculator 824 which generates a square root of the output of the summer 820. The output of the square root calculator 824 may be coupled to the multiply-by-two calculator 828, which multiplies the output of the square root calculator 824 by two.

Operation of the embodiment of the filter and amplitude calculator 728 of FIG. 17 will now be described. To simplify the explanation, the output of the current sensor 716 will be represented below as $A\sin(\omega t+\theta)$, where t is time, A is an amplitude, and $\theta$ is a phase offset of the output of the current sensor 716. Additionally, the first sinusoidal signal will be represented as $\sin(\omega t)$. The second sinusoidal signal will be represented as $\cos(\omega t)$. Additionally, the description below will make use of the following well known trigonometric equations:

$$\sin(X)\sin(Y)=\tfrac{1}{2}(\cos(X-Y)-\cos(X+Y));\text{ and} \quad (1)$$

$$\sin(X)\cos(Y)=\tfrac{1}{2}(\sin(X-Y)+\sin(X+Y)). \quad (2)$$

In view of the above, the output of the multiplier 804a may be described as:

$$A\sin(\omega t+\theta)B\sin(\omega t)=\tfrac{1}{2}AB\cos(\theta)-\tfrac{1}{2}AB\cos(2\omega t+\theta); \quad (3)$$

and the output of the multiplier 804b may be described as:

$$A\sin(\omega t+\theta)B\cos(\omega t)=\tfrac{1}{2}AB\sin(\theta)+\tfrac{1}{2}AB\sin(2\omega t+\theta). \quad (4)$$

The LPFs 808 may be configured to have a cut off frequency less than $2\omega$ and such that frequencies including $2\omega$ are significantly attenuated while direct current (DC) components are not significantly attenuated. For example, the LPFs 808 may attenuate the frequency $2\omega$ by at least 3 decibels. With such LPFs, the output of the LPF 808a may be described as $\tfrac{1}{2}A\cos(\theta)$, and the output of the LPF 808b may be described as $\tfrac{1}{2}A\sin(\theta)$. The outputs of the LPFs 808 are then converted to digital values by ADCs 812.

Squaring devices 816 generate the square of the outputs of the ADCs 812. In particular, the output of squaring device 816a may be described as:

$$(\tfrac{1}{4})A^2\cos^2(\theta); \quad (5)$$

and the output of squaring device 816b may be described as:

$$(\tfrac{1}{4})A^2\sin^2(\theta). \quad (6)$$

The summer 820 adds the outputs of the squaring devices 816 together to generate the output:

$$(\tfrac{1}{4})A^2\sin^2(\theta)+(\tfrac{1}{4})A^2\cos^2(v)=(\tfrac{1}{4})A^2(\sin^2(\theta)+\cos^2(\theta))=(\tfrac{1}{4})A^2. \quad (7)$$

The square root calculator 824 generates the square root of the output of the summer 820 to generate an output which may be described as $\tfrac{1}{2}A$. Then the multiply-by-two calculator 828 multiplies the output of the square root calculator 824 by two to generate an output that may be approximately A. Thus, the output of the filter and amplitude calculator 728 may comprise a digital signal that approximates the amplitude of the current flowing from the corresponding conductor 712.

Figure 18:
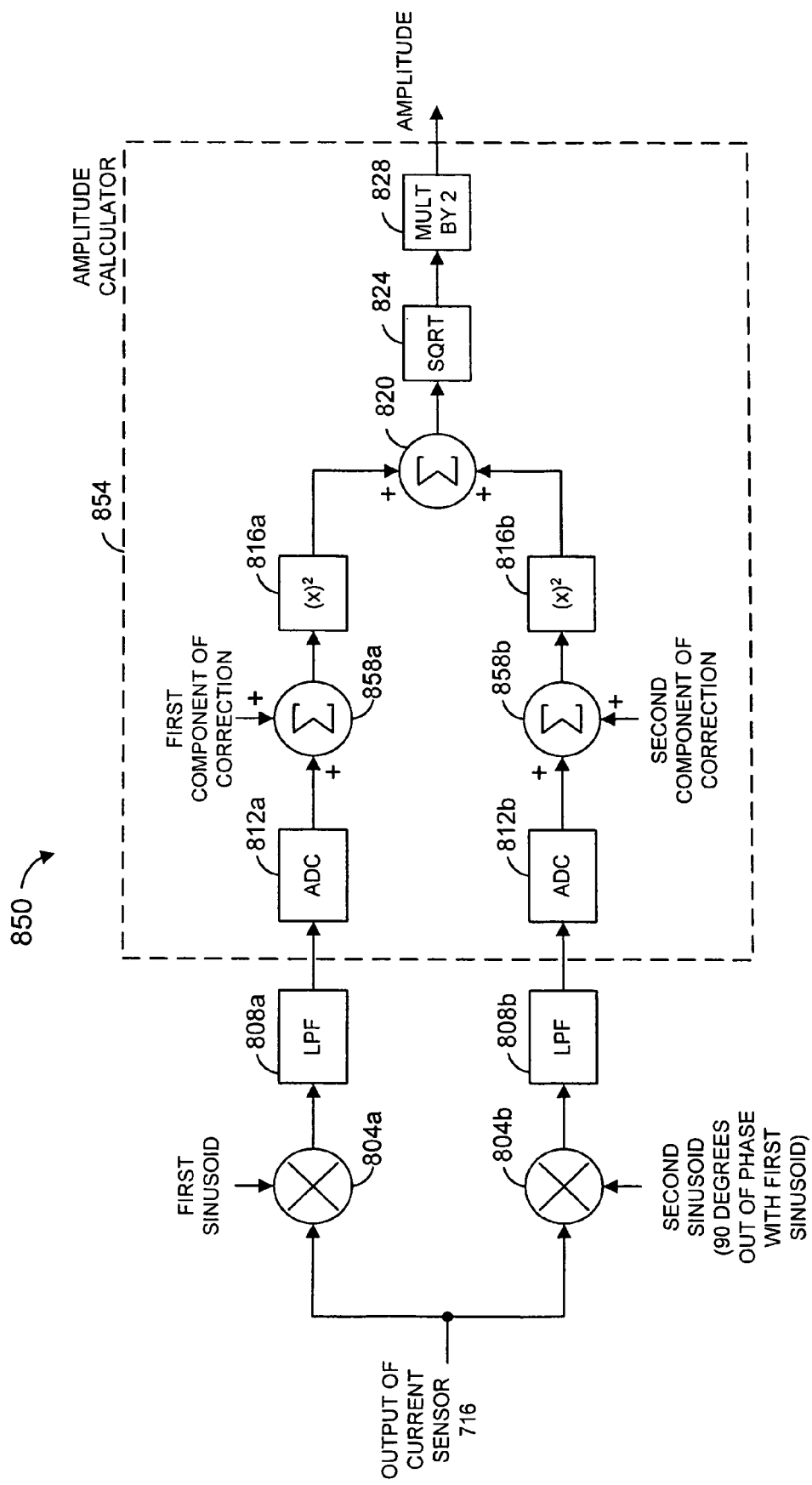
FIG. 18 is a block diagram of another embodiment of the filter and amplitude calculator shown schematically in FIG. 16.

FIG. 18 is a block diagram of another embodiment of a filter and amplitude calculator 850 shown schematically in FIG. 16. The filter and amplitude calculator 850 may comprise an amplitude calculator 854 which is similar to the amplitude calculator 810 of FIG. 17. The amplitude calculator 854, however, additionally may include components for adjusting its output due to ambient conditions.

In particular, the amplitude calculator 854 may include a summer 858a that adds a first component of a correction value to the output of the ADC 812a, and a summer 858b that adds a second component of the correction value to the output of the ADC 812b. The correction value, comprising the first and second components, is a value that may be used to adjust for ambient conditions of the touch screen unit 70. Even when the insulated conductive film 704 is not being touched, the output of each current sensor may indicate that current is flowing from the corresponding conductor 712. This may be due to one or more of several factors including imperfections in electrical components and a leakage current. The leakage current may be a current that flows from the insulated conductive film 704 to another part of the gaming unit such as a cabinet door.

The ambient conditions may change over time, so the correction value may be adjusted over time. The first and second components of the correction value may be calculated, for example, based on the outputs of the ADCs 812 when it is known, assumed, etc., that a person is not touching the insulated conductive film 704. For instance, the first and second correction values may be calculated to try to bring the outputs of the summers 858 to zero when it is known, assumed, etc., that the insulated conductive film 704 is not being touched. To account for the time varying nature of the ambient conditions, each of the first and second correction values may be updated periodically, at times when it is known, assumed, etc., that the insulated conductive film 704 is not being touched, when a change in ambient conditions is detected, etc. For example, outputs of the ADC 812a, at times when it is known, assumed, etc., that the insulated conductive film 704 is not being touched, may be processed (e.g., averaged, low pass filtered, etc.) to generate the first component of the correction value over time. As just one example, an output of the ADC 812a may be used to incrementally adjust the first component of the correction value. The second component of the correction value may be similarly generated. Many other techniques, including known techniques, may be used to generate the first and second components of the correction value.

Figure 19:
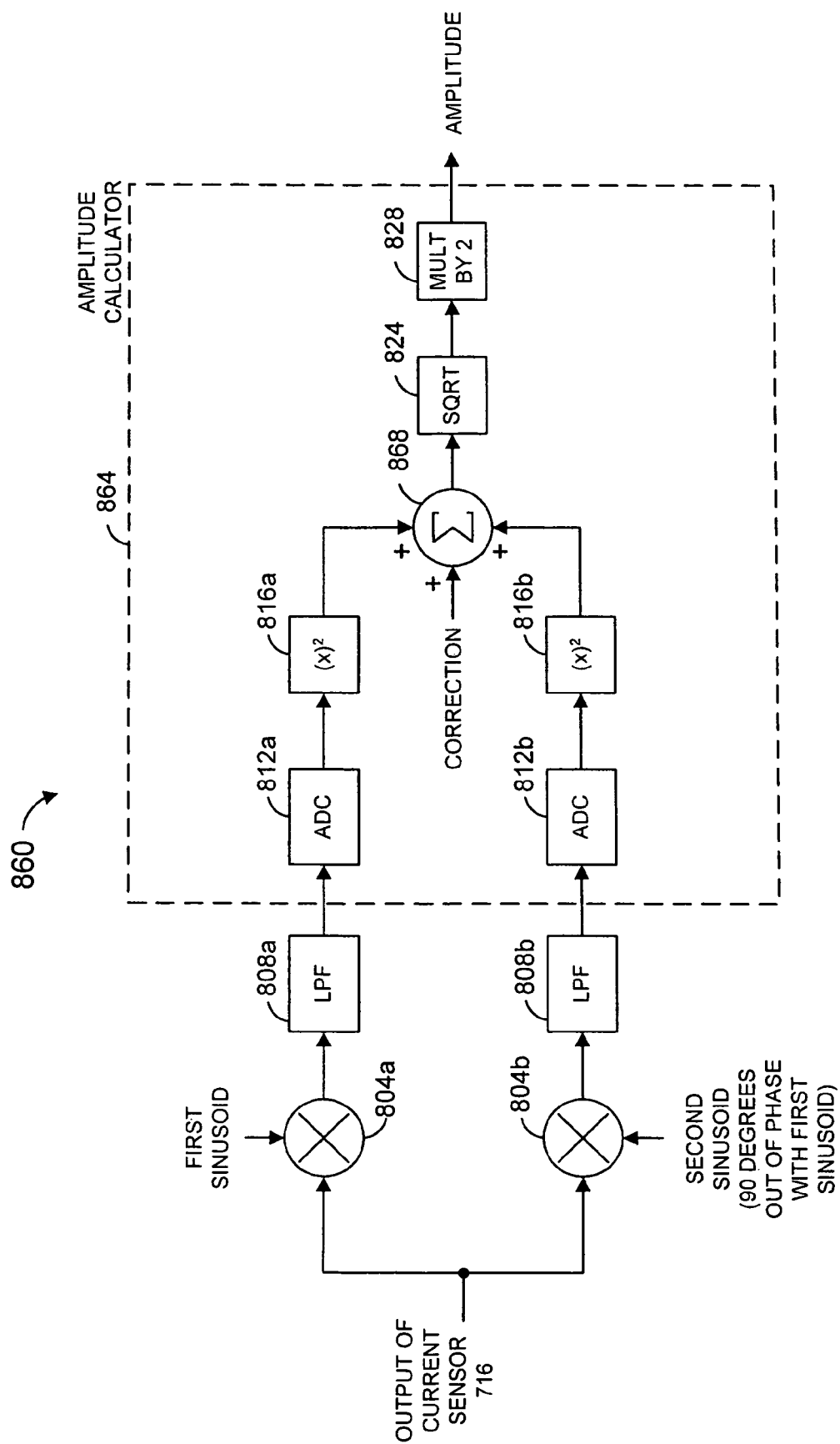
FIG. 19 is a block diagram of another embodiment of a filter and amplitude calculator shown schematically in FIG. 16.

FIG. 19 is a block diagram of another embodiment of a filter and amplitude calculator 860 shown schematically in FIG. 16. The filter and amplitude calculator 860 may comprise an amplitude calculator 864 which is similar to the amplitude calculator 854 of FIG. 18. With the amplitude calculator 864, however, a summer 868 sums the outputs of the squaring calculators 816 and a correction value. Similar to the corrections values described with respect to FIG. 18, the correction value of FIG. 19 may be adjusted in order to bring the output of the summer 868 to zero when it is known, assumed, etc., that the conductive film 704 is not being touched. In a manner similar to that described with respect to FIG. 18, correction values may be generated based on the output of the summer 868.

The point at which signals are converted from analog to digital may be varied from that illustrated in FIGS. 17, 18, and 19, and thus various components could be implemented using analog circuitry, digital circuitry, software, or firmware depending upon the point at which analog-to-digital conversion occurred. Referring to FIG. 18, the ADCs 812 could be positioned, as just one example, after the squaring calculators 816, and thus the squaring calculators 816 and the summers 858 could be implemented using analog circuitry.

Figure 20:
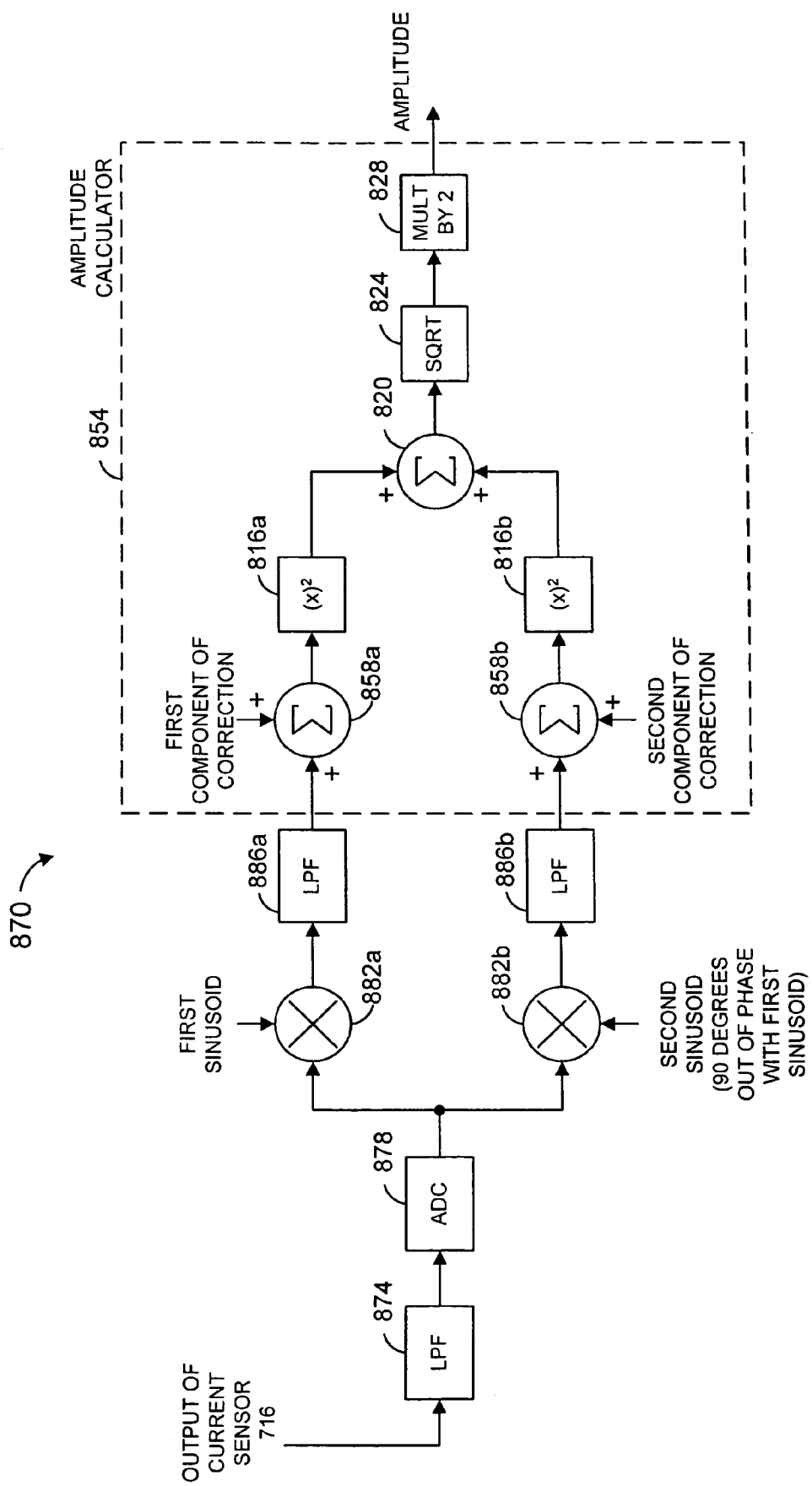
FIG. 20 is a block diagram of yet another embodiment of a filter and amplitude calculator shown schematically in FIG. 16.

FIG. 20 is a block diagram of yet another embodiment of a filter and amplitude calculator 870 shown schematically in FIG. 16. The filter and amplitude calculator 870 may comprise the amplitude calculator 854 of FIG. 18. Additionally, the filter and amplitude calculator 870 may comprise a LPF 874 (e.g., an anti-aliasing filter), an ADC 878, multipliers 882, and LPFs 886. The multipliers 882 and LPFs 886 may be implemented using any combination of digital circuitry, software, firmware, etc.

Referring now to FIGS. 17-19, the multipliers 804 and the LPFs 808 may be implemented, at least in part, using analog circuitry. Referring now to FIGS. 17-20, the ADCs 812 and ADC 878 may be implemented using a mixture of analog and digital circuitry. The squaring calculators 816, the summer 824, the multiply-by-two calculator 828, and the summers 858 may be implemented-using any combination of digital circuitry, software, firmware, etc.

Additionally, some of the components illustrated in FIGS. 17-20 could be omitted. For instance, the multiply-by-two calculator 828 could be omitted by, for example, taking into account, by later processing, that the amplitude generated by the filter and amplitude calculator 728 and/or the filter and amplitude calculator 850 was scaled by one half.

Referring again to FIG. 16, the touch position calculator 732 may receive amplitude signals from the filter and amplitude calculators 726. Based on these amplitude signals, the touch position calculator 732 may determine when a touch occurs. Additionally, the touch position calculator 732 may generate estimates of touch positions for detected touches.

Figure 21:
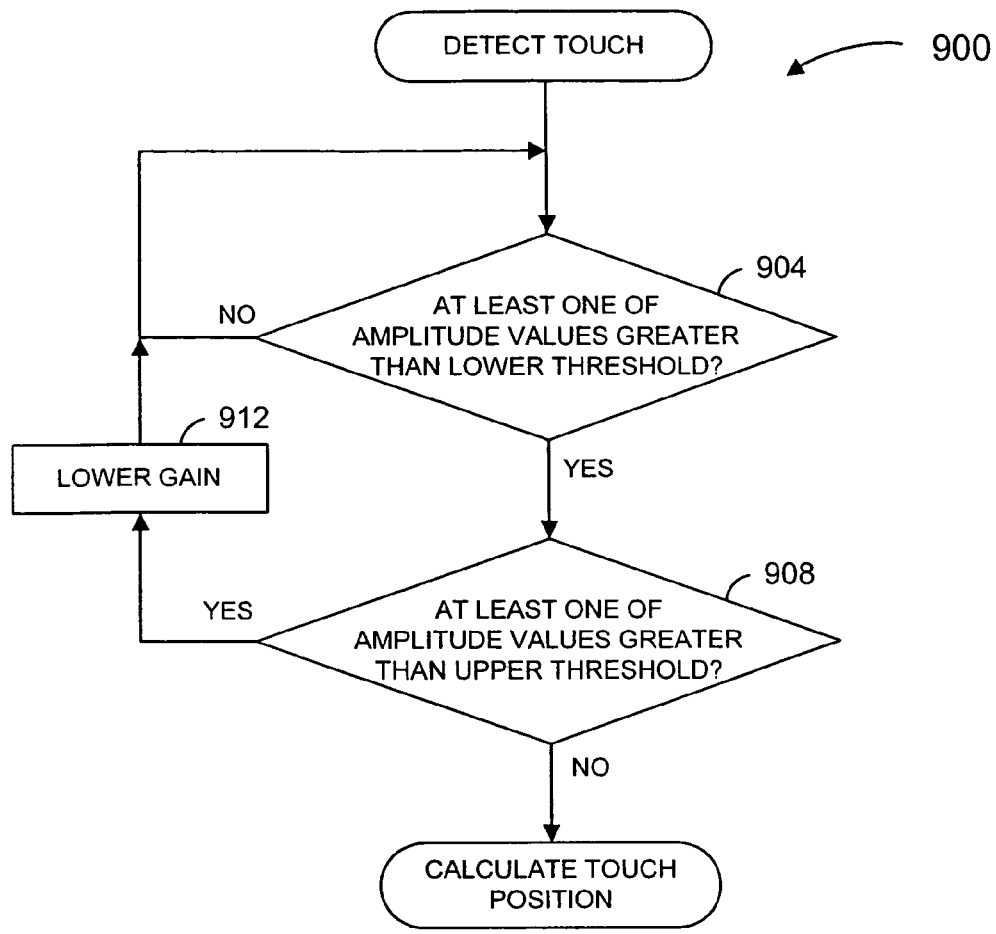
FIG. 21 is a flow diagram of one embodiment of a method for detecting whether a person touched a touch screen.

FIG. 21 is a flow diagram illustrating an embodiment of a method 900, which may be implemented by the touch position calculator 732, for detecting when a touch occurs. It is to be understood that the method 900 is merely one example of a method that may be used. One of ordinary skill in the art will recognize that other techniques for detecting when a touch occurred may be utilized as well.

The method 900 may be implemented, for example, for each of a plurality of sets of amplitude values, where a set of amplitude values may comprise one amplitude value corresponding to each filter and amplitude calculator 726. Each amplitude value in the set of amplitude values may be based on the amplitude signal generated by the corresponding filter and amplitude calculator 726. For example, each amplitude value may be one value from the amplitude signal. Also, each amplitude value may be generated from a plurality of values of the amplitude signal. For example, the amplitude value may be generated as an average of a plurality of amplitude signal values. As another example, the amplitude signal may be filtered, and the amplitude value may comprise the output of the filter.

At a block 904, it may be determined whether at least one of the amplitude values from the set of amplitude values is greater than a lower threshold. If the amplitude values are all below the lower threshold, this may indicate, for example, that the amplitude values may merely reflect ambient conditions and/or noise. If at least one of the amplitude values is not greater than the lower threshold, then the flow of the method 900 may return to the block 904.

If at least one of the amplitude values is greater than the lower threshold, then the method 900 may proceed to a block 908. At the block 908, it may be determined whether at least one of the amplitude values is greater than an upper threshold. If one or more of the amplitude values is greater than the upper threshold, this may indicate that the environment has changed and the gain of the AGC 724 (FIG. 16) should be lowered. For example, it may indicate that the person touching the insulated conductive coating 704 is also touching a grounded metal object. If at least one of the amplitude values is greater than the upper threshold, then the method 900 may proceed to a block 912.

At the block 912, the gain of the AGC 724 may be adjusted lower, and the method may proceed back to the block 904. If, however, none of the amplitude values is greater than the upper threshold, then the method 900 may end, and a method for generating a touch position estimate may be invoked.

In another embodiment, the amplitude values may be processed, and the processed amplitude values may be compared to thresholds. For example, the amplitude values may be added together, averaged, filtered, etc., to generate a processed value, and the processed value may be compared to lower and upper thresholds.

Figure 22:
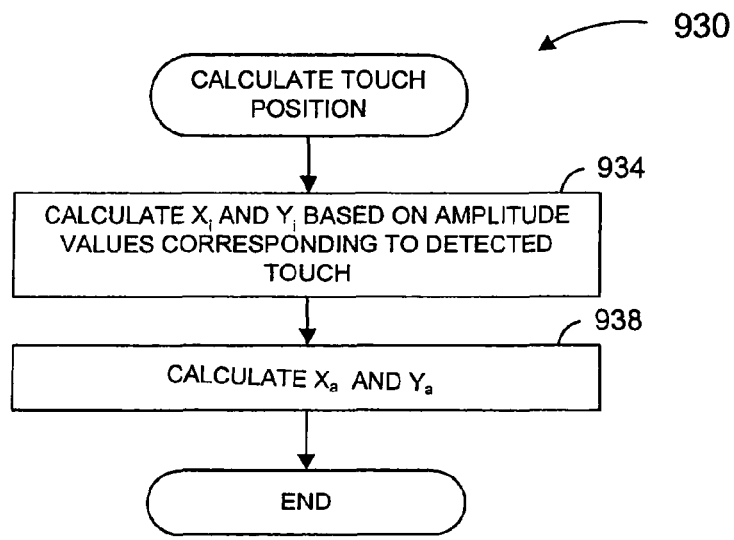
FIG. 22 is a flow diagram of one embodiment of a method for calculating an estimate of a touch position.

FIG. 22 is a flow diagram illustrating an embodiment of a method 930, which may be implemented by the touch position calculator 732, for generating a touch position estimate. It is to be understood that the method 930 is merely one example of a method that may be used. One of ordinary skill in the art will recognize that other techniques for generating a touch position estimate may be utilized as well.

At a block 934, an initial estimate $X_i$ of a horizontal position and an initial estimate $Y_i$ of a vertical position may be generated based on a set of amplitude values, where a set of amplitude values may comprise one amplitude value corresponding to each filter and amplitude calculator 726, and also corresponding to a detected touch. Each amplitude value in the set of amplitude values may be based on the amplitude signal generated by the corresponding filter and amplitude calculator 726. For example, each amplitude value may be one value from the amplitude signal that corresponds to a detected touch. Also, each amplitude value may be generated from a plurality of values of the amplitude signal that correspond to a detected touch. For example, the amplitude value may be generated as an average of a plurality of amplitude signal values that correspond to a detected touch. As another example, the amplitude signal may be filtered, and the amplitude value may comprise the output of the filter at a time that corresponds to a detected touch.

The initial estimate $X_i$ of the horizontal position and the initial estimate $Y_i$ of a vertical position may be generated according to the following equations:

$$X_i = (V_b - V_d)/(V_b + V_d); \text{ and} \tag{8}$$

$$Y_i = (V_a - V_c)/(V_a + V_c); \tag{9}$$

where $V_a$ is an amplitude value corresponding to the output of filter and amplitude calculator 726a, $V_b$ is an amplitude value corresponding to the output of filter and amplitude calculator 726b, $V_c$ is an amplitude value corresponding to the output of filter and amplitude calculator 726c, $V_d$ is an amplitude value corresponding to the output of filter and amplitude calculator 726d, $X_i$ corresponds to an initial estimate of the horizontal position of the touch from the left side of the touch screen, and $Y_i$ corresponds to an initial estimate of the vertical position of the touch from the top side of the touch screen.

The position estimates $X_i$ and $Y_i$ may be related to the vertical and horizontal position of the detected touch, but because the resistivity of the conductive coating 704 (FIG. 16) is typically not uniform, they may not accurately reflect the touch position. Thus, at block 938, the position estimates $X_i$ and $Y_i$ may be converted to position values that more accurately reflect the touch position using, for example, a transformation according to the equations:

$$X_a = a_0 + a_1 X_i + a_2 Y_i + a_3 X_i Y_i; \text{ and} \tag{10}$$

$$Y_a = b_0 + b_1 Y_i + b_2 X_i + b_3 X_i Y_i; \tag{11}$$

where $X_a$ is a more accurate estimate of the horizontal position of the touch from the left side of the touch screen, $Y_a$ is a more accurate estimate of the vertical position of the touch from the top side of the touch screen, and $a_0$, $a_1$, $a_2$, $a_3$, $b_0$, $b_1$, $b_2$, and $b_3$ are conversion parameters for converting $X_i$ and $Y_i$ to $X_a$ and $Y_a$. Other conversions can be utilized as well including, for example, lower-order or higher-order conversions.

Figure 23:
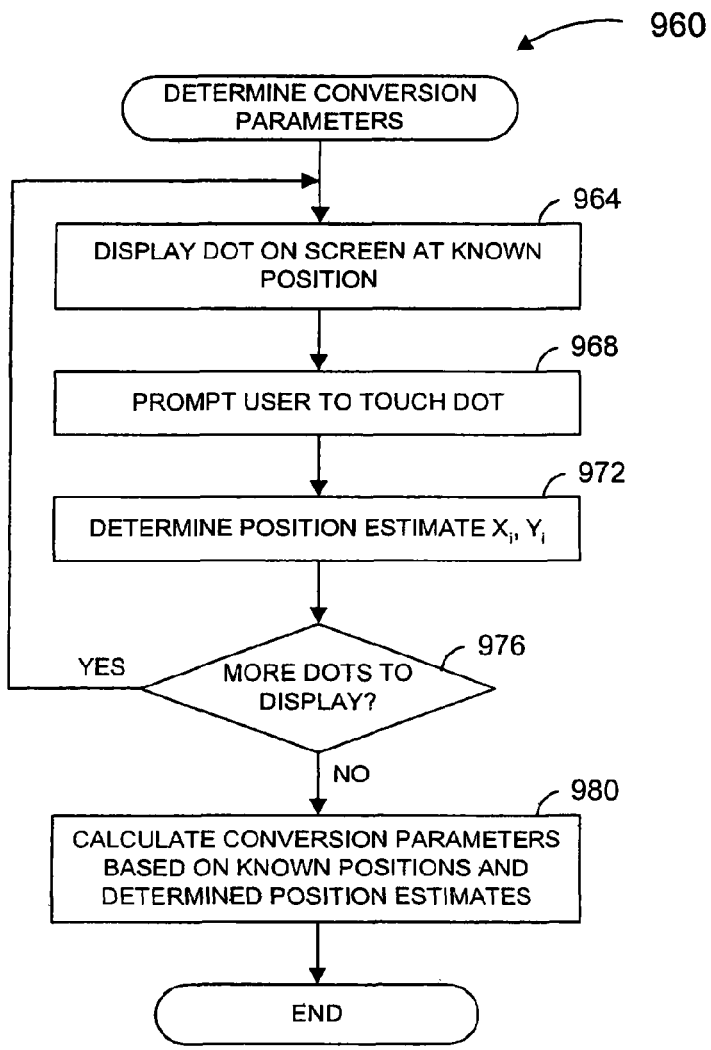
FIG. 23 is a flow diagram of one embodiment of a method for determining parameters for adjusting an touch position estimate.

The conversion parameters may be determined using various techniques, including known techniques. FIG. 23 is a flow diagram illustrating one embodiment of a method 960 for generating the conversion parameters, and will be described with reference to FIG. 1. It will be understood by those of ordinary skill in the art that the method of FIG. 23 is merely one example of a technique for generating conversion parameters that may be utilized.

At a block 964, a dot may be displayed on the display 70 at a known position. At a block 968, a user may be prompted to touch the displayed dot. For example, prompt may be displayed on the display 70, and/or the user may be prompted via the speakers 62 using an audio prompt.

When a touch is detected, a touch position estimate (i.e., $X_i$ and $Y_i$) corresponding to the dot may be generated at a block 972. At a block 980 it may be determined whether more dots are to be displayed. For example, the blocks 964, 968 and 972 may be repeated for a plurality of dots at different positions. In one embodiment, the number of dots should be at least equal to the number of conversion parameters. In one example in which eight conversion parameters are to be used, the blocks 964, 968 and 972 may be repeated nine times for nine different dots.

At a block 980, the conversion parameters may be determined based on the known positions of the dots and the position estimates determined at the block 972. In one embodiment, nine different touch position estimates (i.e., $X_i$ and $Y_i$) determined at the block 972 and the equations (10) and (11) may be combined to form a system of 18 equations with 8 unknowns. A set of conversion parameters that solves or best fits the system of equations may be determined using any of a variety of techniques, including known techniques. In other embodiments, more or less touch position estimates may be used to determine the conversions parameters.

Figure 24:
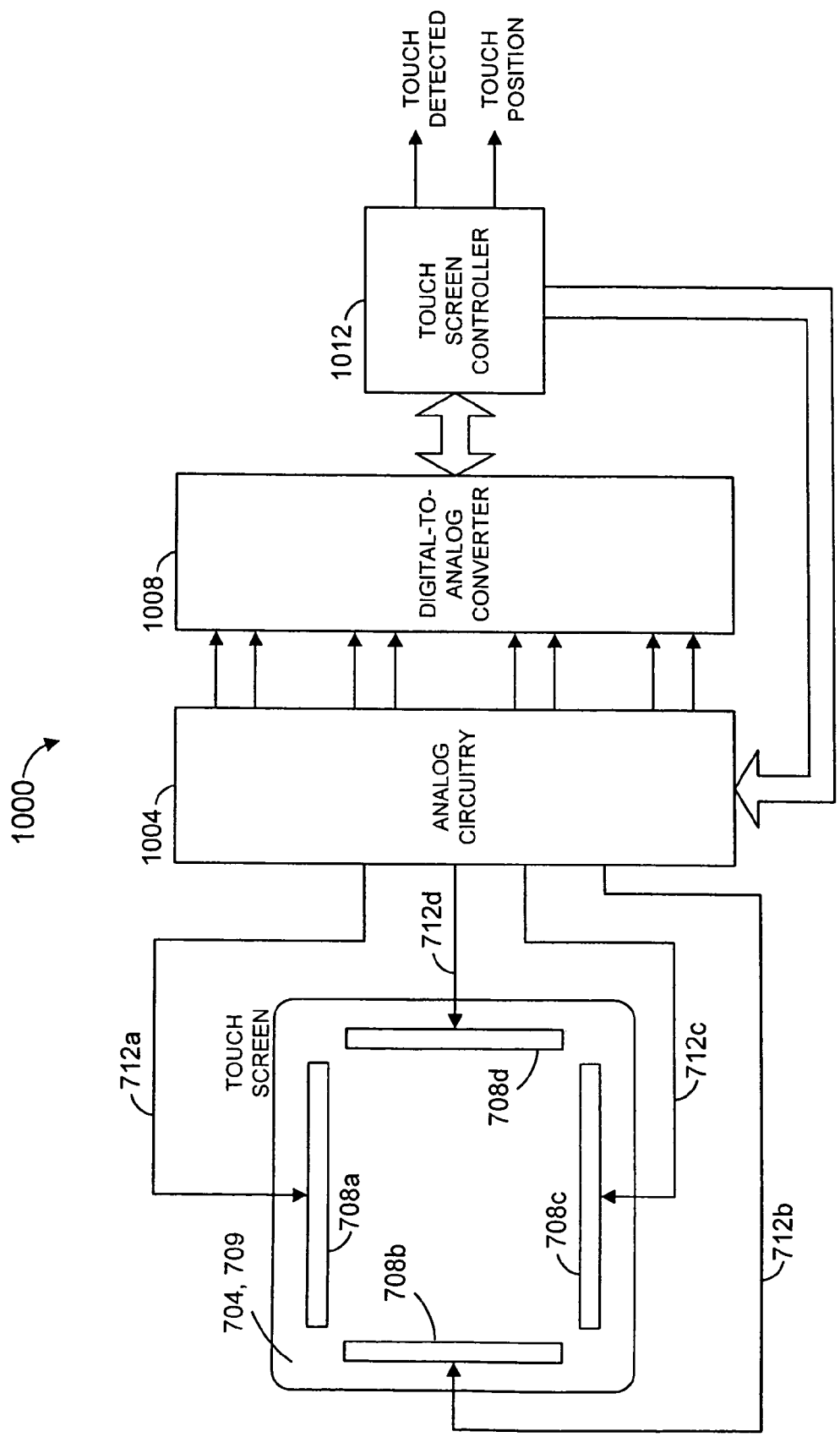
FIG. 24 is a block diagram of one embodiment of the touch screen unit shown schematically in FIG. 3.

FIG. 24 is a block diagram of one embodiment of a touch screen unit 1000. The touch screen unit 1000 may comprise the conductive coating 704, the electrodes 708a, 708b, 708c, and 708d, the transparent insulating layer 709, and the conductors 712a, 712b, 712c, and 712d described with reference to FIG. 16. Additionally, the touch screen unit 1000 may comprise analog circuitry 1004, a ADC 1008, and a touch screen controller 1012.

In one embodiment, the analog circuitry 1004 may comprise at least a portion of the current sensors 716 as described with reference to FIG. 16. Additionally, the analog circuitry 1004 may comprise at least a portion of the multipliers 804 and the LPFs 808, as described with reference to FIG. 17, corresponding to each of the current sensors 716a, 716b, 716c, and 716d. The outputs of the current sensors 716 may be coupled to the ADC 1008.

The ADC 1008 may comprise the ADCs 812, as described with reference to FIG. 17, corresponding to each of the current sensors 716a, 716b, 716c, and 716d. The ADC 1008 may comprise a plurality of ADCs. For example, the ADC 1008 may comprise eight ADCs—two for each of the current sensors 716a, 716b, 716c, and 716d. Alternatively, the ADC 1008 may comprise one ADC that is time-shared. Similarly, the ADC 1008 may comprise a number of ADCs less than eight, where one or more of the ADCs are time-shared. The output of the ADC 1008 may be coupled to the touch screen controller 1012.

The touch screen controller 1012 may comprise a processor and a memory, and may have a structure similar to that of the controller 100 described with reference to FIG. 3. The touch screen controller 1012 may be configured according to software instructions to implement squaring calculators 816, summers 820, square root calculators 824, and multiply-by-two calculators 828, as described with reference to FIG. 17, corresponding to each of the current sensors 716a, 716b, 716c, and 716d. Similarly, the touch screen controller 1012 may be configured according to software instructions to implement summers 858, as described with reference to FIG. 18, corresponding to each of the current sensors 716a, 716b, 716c, and 716d. Additionally, the touch screen controller 1012 may be configured according to software instructions to implement the touch position calculator 732 as described with reference to FIG. 16. Further, the touch screen controller 1012 may be configured according to software instructions to implement at least portions of the methods 900, 930, and 960 as described with reference to FIGS. 21-23. The controller 100 (FIG. 3) could implement at least portions of the methods 900, 930, and 960 as well. In some embodiments, the touch screen controller 1012 may be omitted, and the controller 100 may implement the functions carried out by the touch screen controller 1012.

Operating Frequency Selection

Different apparatus in which a touch screen unit may be used, different environments, etc., may influence ambient conditions related to the touch screen unit. For example, a touch screen unit may experience interfering signals of various levels, frequency characteristics, etc., depending on the particular apparatus, the location of the apparatus, etc.

Figure 25:
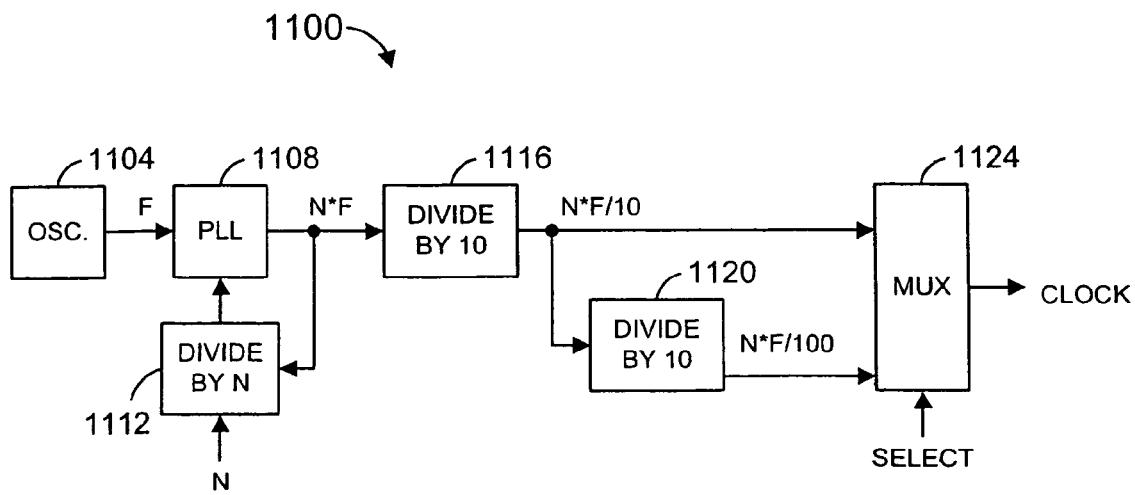
FIG. 25 is a block diagram of one embodiment of a clock generating unit.

FIG. 25 is a block diagram of one embodiment of a clock generating unit 1100 that may be used to generate a clock at one of a plurality of frequencies. The clock generating unit 1100 may comprise an oscillator 1104 that generates a signal having a frequency F. The clock generating unit 1100 may also comprise a phase locked loop (PLL) 1108 coupled to the oscillator 1104, and a configurable frequency divider circuit 1112 coupled to the PLL 1108. The frequency divider circuit 1112 may be configured to generate an output signal having a frequency of an output signal of the PLL 1108, but divided by N. The frequency divider circuit 1112 may receive another input signal indicative of N. The PLL 1108 receives the signal generated by the oscillator 1104 and the signal generated by the frequency divider circuit 1112, and generates its output signal. The output signal of the PLL 1108 may have a frequency of N*F.

The clock generating unit 1100 may further comprise a frequency divider circuit 1116, a frequency divider circuit 1120, and a multiplexer 1124. The frequency divider circuits 1116 and 1120 may each be configured to generate an output signal having a frequency of an input signal, but divided by 10. The frequency divider circuit 1116 receives as its input signal the output of the PLL 1108. Thus, the output signal of the frequency divider circuit 1116 has a frequency of N*F/10. The frequency divider circuit 1120 receives as its input signal the output signal of the frequency divider circuit 1116. Thus, the output signal of the frequency divider circuit 1120 has a frequency of N*F/100.

The multiplexer 1124 receives the outputs of the frequency divider circuits 1116 and 1120 and selects one of these as a clock signal based on a select signal. Referring to FIG. 16, the clock signal generated by the clock generating unit 1100 may be used by the sinusoid generator 720 to generate sinusoidal signals at different frequencies. Similarly, referring to FIGS. 17-20, the clock signal generated by the clock generating unit 1100 may be used to generate the first and second sinusoidal signals at different frequencies, and/or to operate the ADCs 812 and 886 at different frequencies.

Each of the frequency divider circuit 1112 and the multiplexer 1124 may be controlled, for example, by the main controller 100 (FIG. 3) and/or the touch screen controller 1012 (FIG. 24). For example, the main controller 100 or the touch screen controller 1012 may cause the frequency divider circuit 1112 to divide by a particular N. Similarly, the main controller 100 or the touch screen controller 1012 may cause the multiplexer 1124 to select a particular one of its inputs.

Table 1 illustrates one example of a set of frequencies that may be generated by the clock generating unit 1100. It is to be understood that frequencies other than those of Table 1 may be generated by the clock generating unit 1100. Additionally, one of ordinary skill in the art will recognize that different embodiments of clock generating units may be used that employ more or less frequency divider circuits to generate more or less numbers of frequencies. As merely one example of a general guide to choosing frequencies based on a base frequency F, it may useful to include frequencies (X/10)*F for various values of X, where X is not evenly divisible by two. This may help to avoid harmonics of an interfering signal. It is to be understood, however, that in some embodiments, values of X may be used that are evenly divisible by two. Additionally, in some embodiments, frequencies (X/Y)*F may be used for various values of X and for one or more values of Y where Y need not, but could, be ten.

TABLE 1

| N | MUX | FREQUENCY |
|---|---|---|
| 10 | Divide by 10 | 1.0 * F |
| 13 | Divide by 10 | 1.3 * F |
| 17 | Divide by 10 | 1.7 * F |
| 19 | Divide by 10 | 1.9 * F |

TABLE 1-continued

| N | MUX | FREQUENCY |
|---|---|---|
| 90 | Divide by 100 | 0.9 * F |
| 70 | Divide by 100 | 0.7 * F |
| 57 | Divide by 100 | 0.57 * F |
| 33 | Divide by 100 | 0.33 * F |

One or more of the blocks 1108, 1112, 1116, 1120, and 1124 may be implemented using analog circuitry, digital circuitry, or software. In other examples, some or all of the blocks in FIG. 25 may be modified, rearranged, and/or omitted. As just one example, the PLL 1108 and the frequency divider circuit 1112 may be coupled to generate a signal having a frequency F/N.

Other types of clock generating units may be used as well. As just one example, a clock generating unit that employs a configurable counter may be used. For instance, the configurable counter may be programmed to count down from a number. When the counter reaches zero, the counter may be reset again begin to count down from the number. The clock signal may switch from a high state to a low state, and vice versa, every time the counter reaches zero. The frequency of the clock signal generated by such a clock generating unit may be changed by programming the configurable counter to count down from another number.

Figure 26:
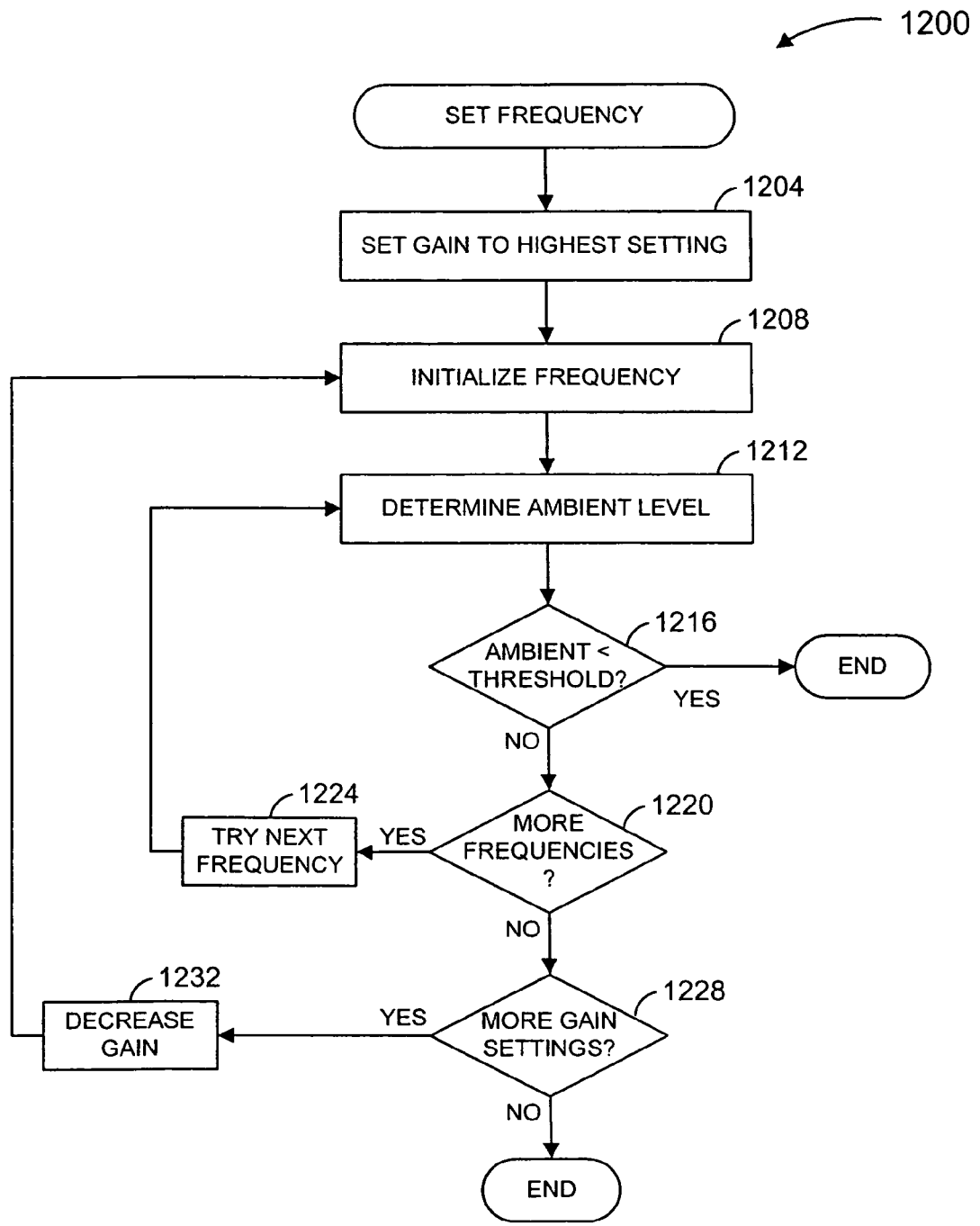
FIG. 26 is a flow diagram of one embodiment of a method for setting an operating frequency of a touch screen unit.

FIG. 26 is a flow diagram illustrating an embodiment of a method 1200 for setting an operating frequency of a touch screen unit. Referring to FIGS. 16-20, the operating frequency may be, for example, the frequency of the sinusoidal signal generated by the sinusoid generator 720 and the first and second sinusoids. The method 1200 may be implemented, for example, by the main controller 100 (FIG. 3) and/or the touch screen controller 1012 (FIG. 24). The method 1200 will be described with reference to FIGS. 16 and 25, although it will be understood by those of ordinary skill in the art that the method 1200 may be used in other types of touch screen units and with other types of clock generating units.

At a block 1204, a gain of the touch screen unit may be set to a highest setting. For example, the AGC 724 may be set to a highest setting. At block 1208, the operating frequency may be initialized. For example, N and the SELECT signal in FIG. 25 may be set to particular values corresponding to an initial frequency.

At a block 1212, an ambient level may be determined. The ambient value may be determined when it is known, assumed, etc., that the insulated conductive film 704 is not being touched. The ambient value may be determined based on, for example, information indicative of the current flowing in one or more of conductors 712. Such information may include one or more of the first and second correction components of FIGS. 18 and 20, the correction of FIG. 20, the amplitudes generated by the amplitude calculators of FIGS. 17-20, etc. Such information corresponding to each of the one or more conductors 712 may be combined to generate an ambient value. For example, respective values corresponding to the one or more of conductors 712 may be averaged, weighted averaged, summed, squared and then summed, filtered, etc.

At a block 1216, the ambient value may be compared to a threshold. If the ambient value is less than the threshold, the flow may end. If the ambient value is not less than the threshold then the flow may proceed to a block 1220. At the block 1220, it may be determined if there are more frequencies available to try. If there are more frequencies, the operating frequency may be set to a new frequency at a block 1224. Then, the flow may proceed back to the block 1212.

If at the block 1220 it is determined that there are no more frequencies available to try, the flow may proceed to a block 1228. At the block 1228, it may be determined whether there are more gain settings available to try. If it is determined that there are more gain settings, the flow may proceed to a block 1232. At the block 1232, the gain of the touch screen unit may be decreased to a next lower level. Then, the flow may proceed to the block 1208. If it is determined that there are no more gain settings to try, the flow may end.

Optionally, the ambient levels determined at the block 1212 may be stored. Then, if at the block 1228 it is determined that there are no more gain settings to try, a minimum ambient level of the stored ambient levels may be determined. Additionally, the frequency corresponding to the minimum ambient level may be determined. Then, the operating frequency may be set to the frequency corresponding to the minimum ambient level.

Figure 27:
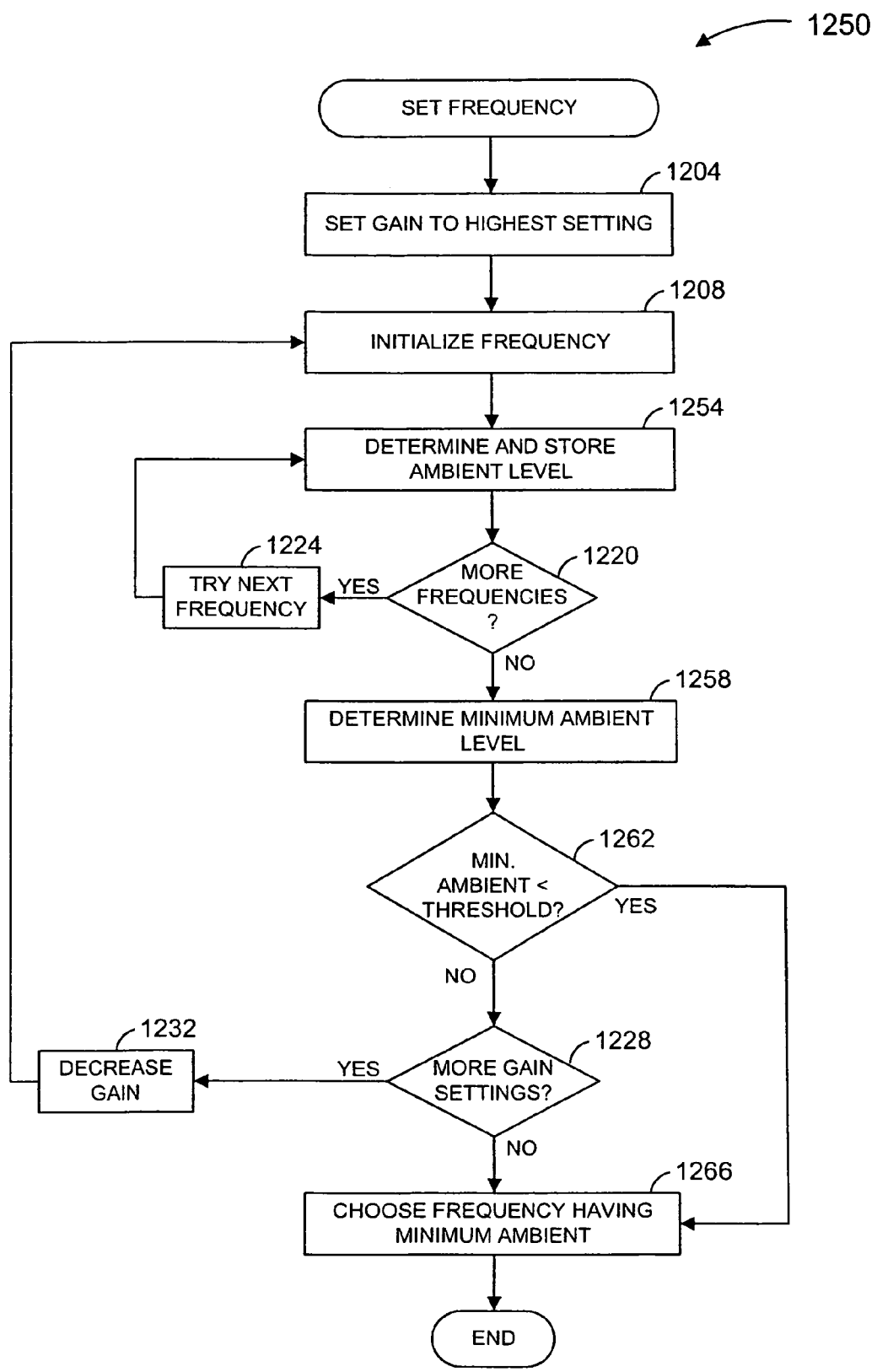
FIG. 27 is a flow diagram of another embodiment of a method for setting an operating frequency of a touch screen unit.

FIG. 27 is a flow diagram illustrating another embodiment of a method 1250 for setting an operating frequency of a touch screen unit. The method 1250 includes some of the same blocks as that of FIG. 26. Thus, only the differences will be described. After the operating frequency is initialized at the block 1208, the flow may proceed to a block 1254. At the block 1254, the ambient level may be determined as described with reference to block 1212 of FIG. 26, and the ambient level may be stored.

If more frequencies are available and after setting the operating frequency to a next frequency, the flow may proceed back to the block 1254. If more frequencies are not available, the flow may proceed to a block 1258. At the block 1258, a minimum of the stored ambient levels may be determined. At a block 1262, it may be determined if the minimum ambient level is less than the threshold. If it is less than the threshold, the flow may proceed to a block 1266. At the block 1266, the operating frequency may be set to the frequency corresponding to the minimum ambient level.

It at block 1262 it is determined that the minimum ambient level is not less than the threshold, the flow may proceed to the block 1228. If it is determined at the block 1228 that there are not more gain settings available, the flow may proceed to the block 1266.

The touch screen controller 1012 (FIG. 24) may be configured according to software instructions to implement at least portions of the methods 1200 and 1250 as described with reference to FIGS. 26 and 27. The controller 100 (FIG. 3) could implement at least portions of the methods 1200 and 1250 as well.

The flowcharts of FIGS. 21-23, 26, and 27 may represent a number of portions or routines of one or more computer programs, which may be stored in one or more of the memories of the controller 100 or of the memory of the touch screen controller 1012. The computer program portions may be written in any high level language such as C, C++, C#, Java or the like or any low-level assembly or machine language. By storing the computer program portions therein, various portions of the memories 102, 106, or a memory or memories associated with the touch screen controller 1012, are physically and/or structurally configured in accordance with computer program instructions. Additionally, some or all of the blocks of the flowcharts of FIGS. 21-23, 26, and 27 may implemented via hardware.

In the above description, various methods have been described with reference to flow diagrams. It will be apparent to one of ordinary skill in the art that each of these methods may be implemented, in whole or in part, by software, hardware, and/or firmware. If implemented, in whole or in part, by software, the software may be stored on a tangible medium such as a CD-ROM, a floppy disk, a hard drive, a digital versatile disk (DVD), a ROM, an erasable programmable ROM (EPROM), an electrically erasable programmable PROM (EEPROM), a flash memory, etc. Further, although the examples described above were described with reference to various flow diagrams, one of ordinary skill in the art will appreciate that many other methods may alternatively be used. For example, the order of execution of the blocks may be changed, additional blocks may be added, and/or some or all of the blocks may be changed, eliminated, or combined.

Although the above-described examples were described in a gaming apparatus environment, some or all of the described embodiments or other embodiments could be used in other environments as well such as consumer electronics, home computing, business computing, automotive, industrial, etc. For example, some or all of the described embodiments or other embodiments could be used in conjunction with personal computers, workstations, servers, personal digital assistants, cellular phones, televisions, set top boxes, kiosks, automotive computers, etc.

What is claimed is:

1. A gaming apparatus, comprising:
   a display unit;
   a value input device;
   a touch screen unit including:
   a sinusoid generator coupled to a first electrode of a touch screen, the sinusoid generator adapted to generate a first sinusoidal signal having a frequency, the sinusoid generator comprising a modification device configured to modify the frequency of operation of the first electrode;
   a first sensor coupled to the first electrode to generate a first sensed signal indicative of a signal flowing from the first electrode;
   a first multiplier having a first input coupled to the first sensor, a second input coupled to receive a second sinusoidal signal having the frequency and a phase, and an output, wherein the first multiplier is configured to multiply the first sensed signal with the second sinusoidal signal;
   a second multiplier having a first input coupled to the first sensor, a second input coupled to receive a third sinusoidal signal having the frequency and a phase 90 degrees out of phase with the phase of the second sinusoidal signal, and an output, wherein both the first multiplier and the second multiplier are configured to receive the first sensed signal, wherein the second multiplier is configured to multiply the first sensed signal with the third sinusoidal signal;
   a first low pass filter having an input and an output, the input of the first low pass filter coupled to the output of the first multiplier;
   a second low pass filter having an input and an output, the input of the second low pass filter coupled to the output of the second multiplier;
   a first amplitude calculator having a first input, a second input, and an output, wherein the first input of the first amplitude calculator is coupled to the output of the first low pass filter, and wherein the second input of the first amplitude calculator is coupled to the output of the second low pass filter; and
   a touch position calculator having a first input coupled to the output of the first amplitude calculator, wherein the touch position calculator is adapted to generate an estimate of a touch position based on the output of the first amplitude calculator;

a main controller operatively coupled to the display unit, the value input device, and the touch screen unit, the main controller comprising a main processor and a main memory operatively coupled to the main processor, the main controller being programmed to receive value input data via the value input device, the main controller being programmed to cause the display unit to generate a first game display relating to one of the following games: poker, blackjack, slots, keno or bingo, the main controller being programmed to receive player input data via the touch screen unit, the main controller being programmed to determine a value payout associated with an outcome of the game, at least one of the main controller and the touch position calculator configured to determine the frequency of operation from a plurality of frequencies.

2. A gaming apparatus according to claim 1, wherein the first amplitude calculator comprises:

a first analog-to-digital converter (ADC) having an input and an output, wherein the input of the first ADC is coupled to the output of the first low pass filter; and a second ADC having an input and an output, wherein the input of the second ADC is coupled to the output of the second low pass filter.

3. A gaming apparatus according to claim 2, wherein the touch screen unit comprises a touch screen controller operatively coupled to the first analog-to-digital converter (ADC), the second ADC, and the main controller, the touch screen controller comprising a touch screen processor and a touch screen memory operatively coupled to the touch screen processor, the touch screen controller being programmed to calculate an estimate of an amplitude of the signal flowing from the first electrode based on outputs of the first ADC and the second ADC.

4. A gaming apparatus according to claim 3, wherein the main controller is programmed to calculate a touch position estimate based on the estimate of the amplitude of the signal flowing from the first electrode.

5. A gaming apparatus according to claim 3, wherein the touch screen controller is programmed to calculate a touch position estimate based on the estimate of the amplitude of the signal flowing from the first electrode;

wherein the touch screen controller is programmed to provide the touch position estimate to the main controller.

6. A gaming apparatus according to claim 2, wherein the main controller is operatively coupled to the first analog-to-digital converter (ADC) and the second ADC;

wherein the main controller is programmed to calculate an estimate of an amplitude of the signal flowing from the first electrode based on outputs of the first ADC and the second ADC.

7. A gaming apparatus according to claim 6, wherein the main controller is programmed to calculate a touch position estimate based on the estimate of the amplitude of the signal flowing from the first electrode.

8. A gaming apparatus according to claim 1, further comprising an analog-to-digital converter (ADC) having an input and an output, wherein the input of the ADC is coupled to the first sensor, and wherein the output of the ADC is coupled to the first input of the first multiplier and to the first input of the second multiplier.

9. A gaming apparatus according to claim 1, wherein the sinusoid generator further comprises an oscillator configured to generate a signal having a frequency, and wherein the modification device is configured to modify the frequency of operation without a need to change the frequency of the signal generated by the oscillator.

10. A gaming apparatus according to claim 1, wherein the modification device comprises at least one of a multiplexer and a frequency divider.

11. A gaming apparatus according to claim 1, wherein at least one of the touch position calculator and the main controller is configured to determine a plurality of ambient levels corresponding to the plurality of frequencies.

12. A gaming apparatus according to claim 11, wherein at least one of the touch position calculator and the main controller is configured to determine a minimum value from the plurality of ambient levels.

13. A gaming apparatus according to claim 1, wherein the touch screen unit comprises a touch screen controller, the main controller of the touch screen controller configured to determine the frequency of operation based on a minimum of a plurality of ambient levels.

* * * * *